(12) United States Patent
Mitarai et al.

(10) Patent No.: US 8,027,544 B2
(45) Date of Patent: Sep. 27, 2011

(54) INFORMATION PROCESSING METHOD AND INFORMATION PROCESSING APPARATUS

(75) Inventors: Yusuke Mitarai, Tokyo (JP); Masakazu Matsugu, Yokohama (JP); Katsuhiko Mori, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 772 days.

(21) Appl. No.: 12/120,481

(22) Filed: May 14, 2008

(65) Prior Publication Data

US 2008/0285861 A1 Nov. 20, 2008

(30) Foreign Application Priority Data

May 16, 2007 (JP) ................................ 2007-130898

(51) Int. Cl.
*G06K 9/68* (2006.01)
(52) U.S. Cl. ...................................... 382/227; 382/118
(58) Field of Classification Search .................. 382/118, 382/192–201, 224–227
See application file for complete search history.

(56) References Cited

U.S. PATENT DOCUMENTS

| | | | | |
|---|---|---|---|---|
| 6,822,758 B1* | 11/2004 | Morino | ............................ | 358/1.9 |
| 2004/0017947 A1* | 1/2004 | Yang | ............................... | 382/224 |
| 2005/0065733 A1* | 3/2005 | Caron et al. | ...................... | 702/19 |
| 2006/0008150 A1* | 1/2006 | Zhao et al. | ...................... | 382/190 |
| 2008/0125648 A1* | 5/2008 | Bi et al. | ........................... | 600/425 |
| 2008/0175446 A1* | 7/2008 | Kirby et al. | ..................... | 382/118 |
| 2008/0253665 A1* | 10/2008 | Mitarai et al. | ................. | 382/227 |
| 2009/0097733 A1* | 4/2009 | Hero et al. | ...................... | 382/133 |
| 2009/0132213 A1* | 5/2009 | Zhao et al. | ......................... | 703/2 |

FOREIGN PATENT DOCUMENTS

JP 2005-535017 11/2005

OTHER PUBLICATIONS

S. Haykin, Neural Networks A Comprehensive Foundation, 2nd Edition, Prentice Hall, pp. 156-255, enclosed Cover Page and pp. 139-277 (1999).
Joshua B. Tenenbaum, Vin de Silva, John C. Langford, "A Global Geometric Framework for Nonlinear Dimensionality Reduction", Science, vol. 290, pp. 2319-2323, 2000.
Sam T. Roweis, Lawrence K. Saul, "Nonlinear Dimensionality Reduction by Locally Linear Embedding", Science, vol. 290, pp. 2323-2326, 2000.
Bisser Raytchev, Ikushi Yoda, Katsuhiko Sakaue, "Multi-View Face Recognition by Nonlinear Dimensionality Reduction and Generalized Linear Models", Proceedings of the 7th International Conference on Automatic Face Gesture Recognition, pp. 625-630, 2006.

* cited by examiner

*Primary Examiner* — Jingge Wu
(74) *Attorney, Agent, or Firm* — Cowan, Liebowitz & Latman, P.C.

(57) ABSTRACT

Processing data which belong to different classes and label data indicating the classes to which the processing data belong are input (S20). A distance relationship between the processing data is calculated (S22). An interclass separation degree between the classes is set (S23). The distance relationship is updated based on the label data and the interclass separation degree (S24). A data mapping relationship which approximates the updated distance relationship is calculated (S25).

22 Claims, 11 Drawing Sheets

INFORMATION PROCESSING METHOD AND INFORMATION PROCESSING APPARATUS

BACKGROUND OF THE INVENTION

1. Field of the Invention

The present invention relates to a high-efficiency expression technique of data by reducing redundancy, and a processing technique using this data.

2. Description of the Related Art

In recent years, non-linear dimension compression methods represented by "Isomap" of article 1 and "Locally Linear Embedding (LLE)" of article 2 have been proposed. Each of these methods provides a method of mapping data, which are considered to be present on a lower-dimensional manifold, onto a new low-dimensional space, which preserves the surface shape unique to the manifold to have an allowable level, on a high-dimensional space.

Such method is successful in highly efficient pattern expression in terms of expressing data by a lower-dimensional space. However, the method does not use information indicating classes to which data belong, and is not optimal to efficiently express data classifications.

By contrast, a method disclosed in Japanese Patent Laid Open No. 2005-535017 provides a method of expressing images for pattern classifications by extending the conventional Isomap method using a Kernel Fisher linear discriminant function or Fisher linear discriminant function.

Article 3 proposes, as the modification of the conventional Isomap method, a method of building a mapping relationship that enhances the separation degree by forcibly increasing the geodesic distance between data which belong to different classes.

In this way, a method which can preserve the surface shape unique to the manifold to have an allowable level, and can express data for pattern classifications is demanded.

[Article 1] Joshua B. Tenenbaum, Vin de Silva, John C. Langford, "A Global Geometric Framework for Nonlinear Dimensionality Reduction", Science, Vol. 290, pp. 2319-2323, 2000

[Article 2] Sam T. Roweis, Lawrence K. Saul, "Nonlinear Dimensionality Reduction by Locally Linear Embedding", Science, Vol. 290, pp. 2323-2326, 2000

[Article 3] Bisser Raytchev, Ikushi Yoda, Katsuhiko Sakaue, "Multi-View Face Recognition By Nonlinear Dimensionality Reduction And Generalized Linear Models", Proceedings of the 7th International Conference on Automatic Face Gesture Recognition, pp. 625-630, 2006

SUMMARY OF THE INVENTION

The present invention has been made in consideration of the aforementioned problems, and has as its object to provide techniques associated with a data expression method which can preserve the surface shape unique to the manifold to have an allowable level and being suited to data classifications, and a pattern identification method using that expression method.

More specifically, the present invention provides a data expression method which expresses a data set of an identical class as one cluster for a plurality of data labeled to a certain class, and can set a distance between clusters to a desired distance, and a pattern identification method using that expression method.

According to the first aspect of the present invention, there is provided an information processing method comprising: an input step of inputting processing data which belong to different classes and label data indicating the classes to which the processing data belong; a first calculation step of calculating a distance relationship between the processing data input in the input step; a setting step of setting an interclass separation degree between the classes; an updating step of updating the distance relationship based on the label data and the interclass separation degree; and a second calculation step of calculating a data mapping relationship which approximates a distance relationship updated in the updating step.

According to the second aspect of the present invention, there is provided an information processing apparatus, comprising: an input unit adapted to input processing data which belong to different classes and label data indicating the classes to which the processing data belong; a first calculation unit adapted to calculate a distance relationship between the processing data input by the input unit; a setting unit adapted to set an interclass separation degree between the classes; an updating unit adapted to update the distance relationship based on the label data and the interclass separation degree; and a second calculation unit adapted to calculate a data mapping relationship which approximates a distance relationship updated by the updating unit.

Further features of the present invention will become apparent from the following description of exemplary embodiments with reference to the attached drawings.

DESCRIPTION OF THE EMBODIMENTS

Figure 1:
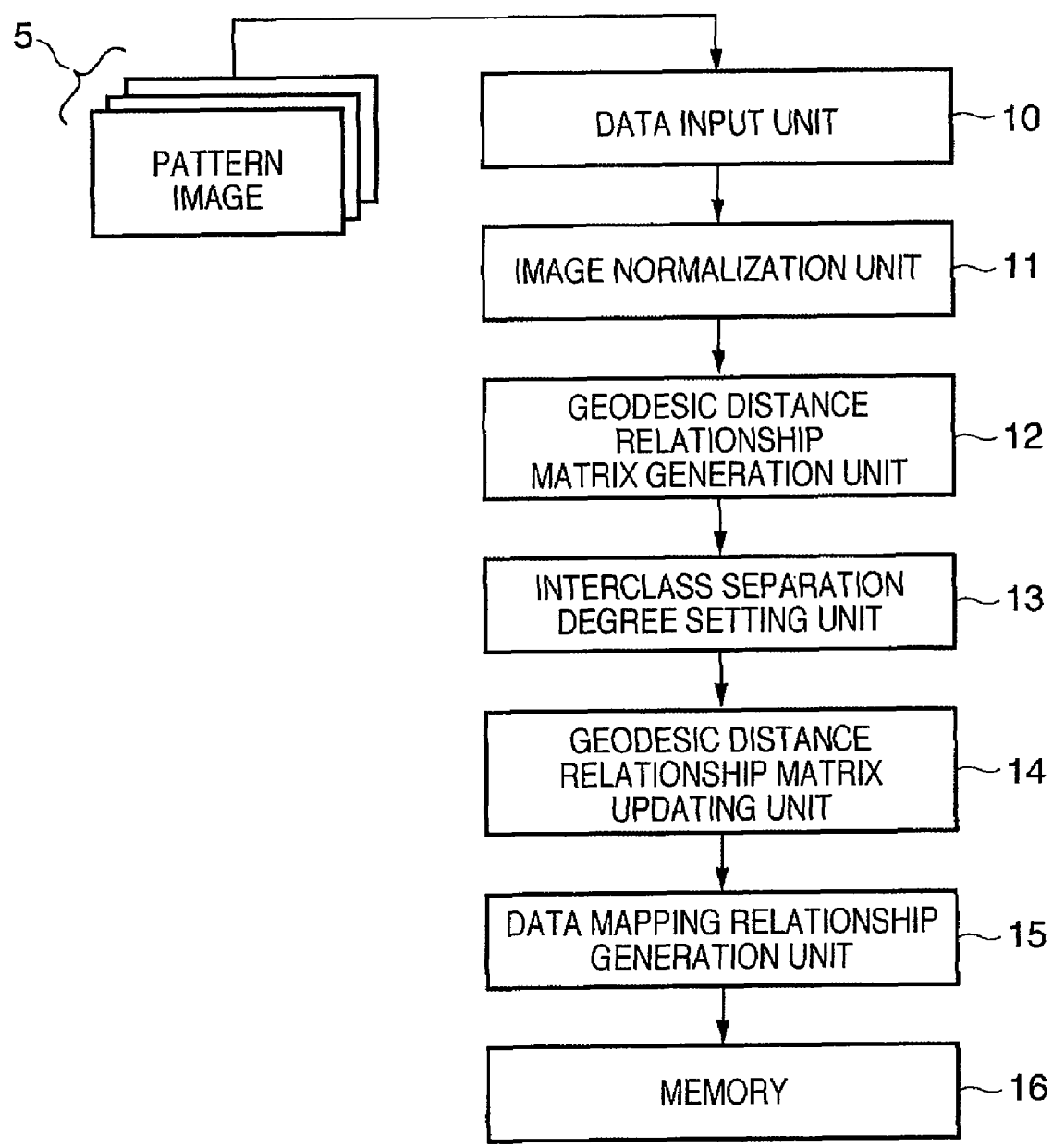
FIG. 1 is an exemplary block diagram showing the functional arrangement of an information processing apparatus which executes data expression processing using pattern images labeled for human facial regions.

Preferred embodiments of the present invention will be described in detail hereinafter with reference to the accompanying drawings. Note that these embodiments will be described as examples of the preferred arrangements of the invention described in the scope of claims, and the invention is not limited to the embodiments to be described hereinafter.

An overview of this embodiment will be described first.

In this embodiment, when label data indicating classes to which processing data belong are input together with the processing data which belong to different classes, the distance relationship between the input processing data is calculated (first calculation). The interclass separation degree between classes is set, and when the distance relationship is updated based on label data and the interclass separation degree, a data mapping relationship that approximates the updated distance relationship is calculated (second calculation).

Note that the distance relationship to be calculated is a geodesic distance relationship, and the distance relationship which is approximated using information indicating the data mapping relationship is a Euclidean distance relationship.

Assume that a graph distance $dG(x1, x2)$ between two processing data $x1$ and $x2$ is $\infty$ when $x1$ and $x2$ are not neighboring data. At this time, a geodesic distance $dM(\xi, \zeta)$ between two processing data $\xi$ and $\zeta$ is smaller one of $dG(\xi, \zeta)$ and $dG(\xi, a)+dG(a, \zeta)$ via processing data a different from the processing data.

Note that the graph distance, i.e., the graph distance $dG(x1, x2)$ between the two processing data $x1$ and $x2$ is a so-called Minkowski distance such as an Euclidean distance, Manhattan distance, and the like when $x1$ and $x2$ are neighboring data. Or the graph distance is a statistical distance such as a Mahalanobis distance.

The interclass separation degree can be set according to a separation degree between classes, which is defined in advance. When a separation degree is large, i.e., when the relationship between certain two classes is to be expressed by largely separating it (e.g., when the difference between these classes is to be emphasized), the interclass separation degree between these two classes is increased. Conversely, when a separation degree is small, e.g., when the relationship between certain two classes need not be expressed by largely separating it (e.g., when these two classes need not be definitely distinguished from each other), the interclass separation degree between these two classes is decreased.

As for this interclass separation degree, a distance between classes may be calculated, and the interclass separation degree may be set based on the calculated distance between classes. In this case, it is preferable to set a large interclass separation degree when the distance between classes is small. With this setting, separation expression of two classes, the separation expression of which is relatively difficult, can be efficiently made. As a method of calculating the distance between classes, it can be calculated using a nearest neighbor method, farthest neighbor method, group average method, centroid method, median method, Ward method, flexible method, and the like, which are popular in cluster analysis.

The determination method as to whether or not two processing data $x1$ and $x2$ are neighboring data is characterized by determining, when processing data $x2$ is included in processing data as many as the number of data which is set in advance in ascending order of distance from processing data $x1$, that the two data $x1$ and $x2$ are neighboring data. Alternatively, when the distance between the two processing data $x1$ and $x2$ is equal to or smaller than a distance which is set in advance, it may be determined that the two processing data $x1$ and $x2$ are neighboring data.

Upon updating the distance relationship, the distance between processing data is updated in proportion to the interclass separation degree between classes to which two processing data respectively belong, and a distance to processing data which belongs to an identical class is updated to be smaller than that to processing data which belongs to a different class.

As a method of updating the distance to processing data which belongs to an identical class to be smaller than that to processing data which belongs to a different class, a method of multiplying the distance to processing data which belongs to an identical class by a positive number smaller than 1 is available. Also, the distance to processing data which belongs to an identical class may be set to be a positive number smaller than that to processing data which belongs to a different class.

A method of calculating the data mapping relationship is to calculate the mapping relationship that minimizes errors between the distance relationship on a space after mapping and that after updating. As such method, a method of calculating a correspondence relationship of processing data after mapping using multidimensional scaling (MDS) is available. Also, a method of calculating a correspondence relationship of processing data after mapping using MDS, and building a neural network trained using the calculated correspondence relationship as supervisory data is available. As this neural network, a multi-layer feedforward neural network may be used.

As the method of calculating the data mapping relationship, a method of calculating a linear mapping relationship which minimizes errors between distance relationship on a space after mapping and that after updating is also used. As such method, the following method is known. That is, let $x_i$ and $x_j$ be the i-th and j-th processing data, and $d_d(i, j)$ be the updated distance relationship between the i-th and j-th processing data. Then, a method of calculating a linear mapping matrix A that minimizes an error function J(A) is known. The error function J(A) is given by:

$$J(A) = \frac{1}{2} \cdot \frac{1}{\sum_{i<j} d_d(i, j)} \sum_{i<j} \frac{(|A^T x_i - A^T x_j| - d_d(i, j))^2}{d_d(i, j)}$$

As the method of calculating the data mapping relationship, a method of calculating a non-linear mapping relationship $\phi(x)$ that minimizes errors between the distance relationship on a space after mapping and that after updating is known. Note that the non-linear mapping relationship $\phi(x)$ is expressed using a Kernel function $K(\xi, \zeta)$ as a real symmetric function satisfying a positive semidefinite property and processing data $x_i$ (i=1, 2, ... ) by $\phi(x)=\Sigma \alpha_i \cdot K(x, x_i)$.

Letting $\kappa_i$ be a vector having a Kernel function value $K(x_i, x_j)$ of processing data $x_j$ with respect to processing data $x_i$ as a j-th element, and $d_d(i, j)$ be the updated distance relationship between processing data $x_i$ and $x_j$, this non-linear mapping relationship $\phi(x)$ is calculated by calculating a matrix $\Gamma$ that minimizes an error function $J(\Gamma)$, which is given by:

$$J(\Gamma) = \frac{1}{2} \cdot \frac{1}{\sum_{i<j} d_d(i, j)} \sum_{i<j} \frac{(|\Gamma^T \kappa_i - \Gamma^T \kappa_j| - d_d(i, j))^2}{d_d(i, j)}$$

and by equating an i-th row vector of the calculated matrix $\Gamma$ to $\alpha_i$. Furthermore, letting $\gamma$ be a positive constant, and $|\gamma_k|L1$ be an L1 norm of a k-th column vector of a matrix $\Gamma$, the non-linear mapping relationship φ(x) may be calculated by calculating the matrix Γ that minimizes an error function J(Γ), which is given by:

$$J(\Gamma) = \frac{1}{2} \cdot \frac{1}{\sum_{i<j} d_d(i,j)} \sum_{i<j} \frac{(|\Gamma^T \kappa_i - \Gamma^T \kappa_j| - d_d(i,j))^2}{d_d(i,j)} + \lambda \cdot \sum_k |\gamma_k|_{L1}$$

and by equating an i-th row vector of the calculated matrix Γ to $\alpha_i$. Upon calculating these mapping relationships, the order of distance relationships after mapping may satisfy at least that of distance relationships after updating.

Furthermore, upon application to pattern identification, identification rules which identify different classes that can be defined on a space to be mapped based on the data mapping relationship is generated, and data to be identified is input (second input) and is mapped using the data mapping relationship. Then, a label of the data to be identified is identified using the mapped data and the generated identification rules.

Some embodiments of the present invention described above will be described in detail hereinafter with reference to the accompanying drawings. Note that some of technical matters to be described hereinafter may be appropriately selected and used in combination.

First Embodiment

Assume that an image to be handled in this embodiment is an extracted image (pattern image) and a grayscale image, which is obtained by extracting a facial region from an original image including a face of a person, and has a size of 20 pixels in the vertical direction×20 pixels in the horizontal direction. Of course, when an original image includes faces of a plurality of persons, there are a plurality of pattern images (data). A label, which indicates whose face it is, is assigned to the face region (pattern) of each individual pattern image (the face region has already undergone labeling processing). That is, the following description will be given under the assumption that the pattern image to be handled in this embodiment includes this label data.

This embodiment will explain a data expression method (technique) of mapping such pattern on a new space.

An extracted image having a size of 20×20 pixels in the vertical and horizontal directions can be considered as a 400 (=20×20)-dimensional vector obtained by sorting pixel values in a raster scan order. In this case, one pattern is one point on a 400-dimensional space. In general, a set of patterns which belong to a specific category "human face" forms a manifold of lower dimensions than the 400-dimensional space. That is, to express "human face", 400 dimensions are redundant, and "human face" can be expressed using a space of lower dimensions.

As a most popular method of reducing this redundancy, a method using principal component analysis (PCA) is known. However, using the PCA which assumes that a pattern distribution is a normal distribution, sufficient redundancy reduction cannot be expected for a set of patterns like "human face", which include essentially non-linear variations such as variations of directions of faces and the like.

Hence, with Isomap proposed by article 1, a geodesic distance between data of arbitrary two points on the non-linear manifold, i.e., a shortest distance between the data of the two points along the manifold is approximately estimated. Then, using multidimensional scaling (MDS), a mapping relationship which approximates, as Euclidean distances, the geodesic distance relationship estimated for all combinations of data, is calculated. In this way, a set of an essentially non-linear distribution can be expressed using a compact space in which the redundancy is reduced.

However, as in the PCA, since Isomap aims at expressing a category "human face" using a compact space, that space is not always suited to express classifications, i.e., whose face that image is. Hence, in this embodiment, expression on a space suited to classifications (e.g., human classes) that segment one category is made using labels assigned in advance to data.

Figure 2:
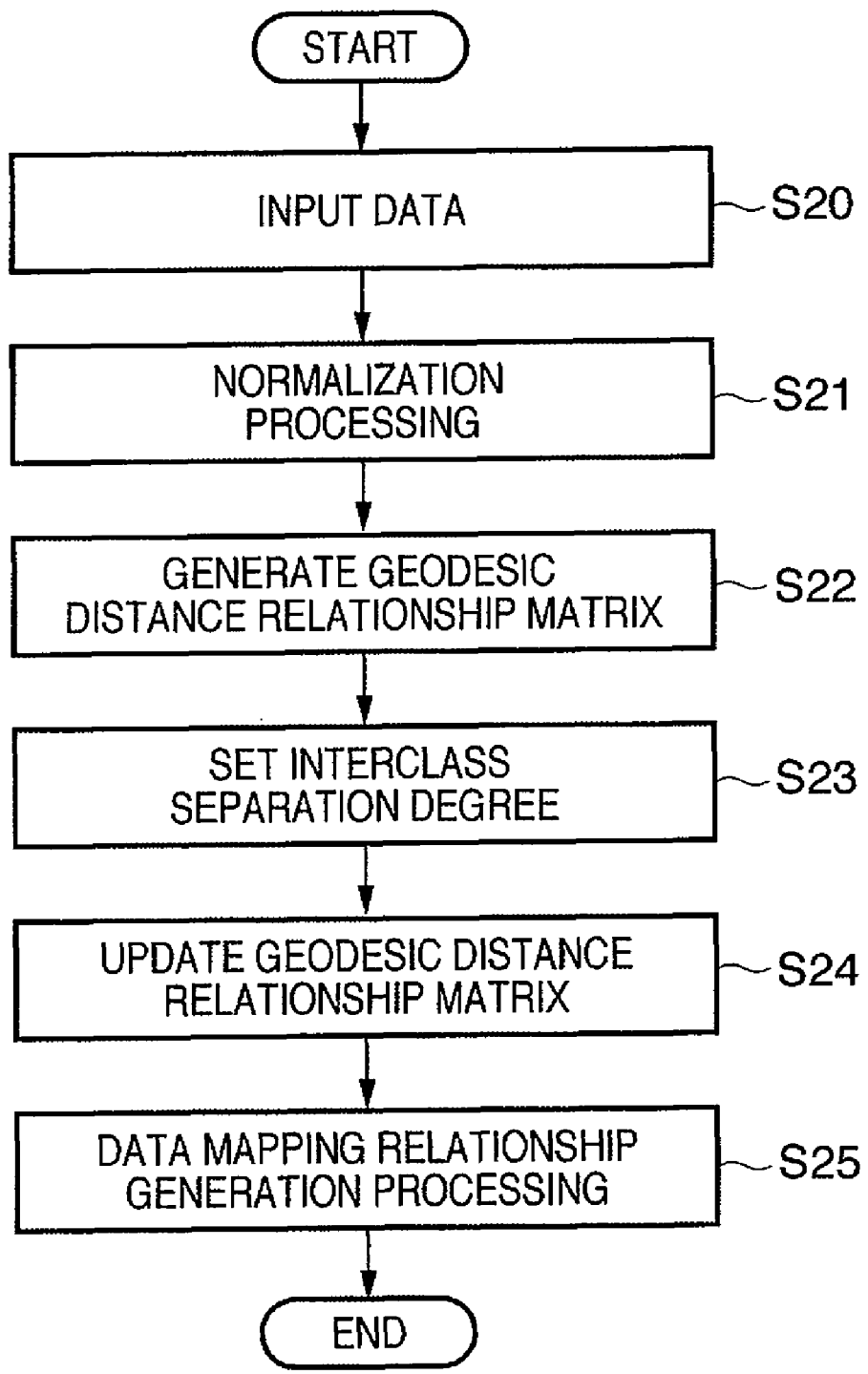
FIG. 2 is a flowchart of the data expression processing to be executed using pattern images.

FIG. 1 is an exemplary block diagram showing the functional arrangement of an information processing apparatus which executes data expression processing using pattern images labeled for human facial regions. FIG. 2 is a flowchart of the data expression processing executed by the information processing apparatus using pattern images. The data expression processing will be described below with reference to FIGS. 1 and 2. Note that the following description practically remains the same even when pattern images have other sizes or objects to be labeled are those other than human faces.

In step S20, a data input unit 10 inputs one or more pattern images 5 described above, and transfers them to a subsequent image normalization unit 11. The data input unit 10 may input pattern images by receiving pattern images transmitted from an external device via a network such as the Internet or the like.

Alternatively, the data input unit 10 may read out pattern images which are saved in a large-capacity information storage device such as a hard disk drive or the like. In any case, the input mode of pattern images to the information processing apparatus is not particularly limited.

Let $\tilde{x}_i$ be a 400-dimensional vector obtained by sorting respective pixels, in a raster scan order, that form an i-th pattern image input to the data input unit 10, and yi be its label. Therefore, "inputting N pattern images to the data input unit 10" is equivalent to input N sets of $\tilde{x}_i$ and $y_i$ to the data input unit 10 (i=1, 2, . . . , N).

The label value is not particularly limited as long as it assumes an identical value for an identical person. For the sake of simplicity, when a data set including classes of m persons (m>1) is used, it can be expressed using m class labels like $y_i \in \{1, 2, \ldots, m\}$.

Of data input to the data input unit 10, a set of data with an identical label is defined as one cluster. Also, in the following description, a set of data with label c is defined as class c.

In step S21, the image normalization unit 11 calculates, for all pattern images (i), $x_i = (\tilde{x}_i - u_i \cdot 1)/\sigma_i$ obtained by normalizing $\tilde{x}_i$ corresponding to a pattern image of the data transferred from the data input unit 10. Then, the image normalization unit 11 holds the calculated values $x_i$.

Note that $u_i$ is an average value of respective elements of the $\tilde{x}_i$ vector. Also, 1 is a vector having the same number of dimensions as $\tilde{x}_i$, i.e., a 400-dimensional vector in which all elements are "1". $\sigma_i$ is a standard deviation of respective elements of the $\tilde{x}_i$ vector. The normalization processing in this step is not indispensable. In general, when data to be input to the data input unit 10 is an image or the like as in this embodiment, the aforementioned normalization is preferably done since factors due to variations of levels of overall signals (pixel values in this case) are to be eliminated.

After the processes executed so far, N sets of normalized pattern images $x_i$ and their labels $y_i$ are stored in an internal memory of the image normalization unit 11 or the like.

In step S22, a geodesic distance relationship matrix generation unit 12 extracts two pattern images from N pattern images normalized by the image normalization unit 11. Since the number of combinations upon selecting two pattern images from N pattern images is N!/2!(N−2)! (=M), M sets each including two pattern images are obtained. The geodesic distance relationship matrix generation unit 12 calculates a geodesic distance dM(i, j) (where dM(i, j) is the geodesic distance between the i-th pattern image $x_i$ and j-th pattern image $x_j$) between two pattern images for each of the M sets, as in Isomap described above. After the M geodesic distances dM(i, j) are obtained, the geodesic distance relationship matrix generation unit 12 calculates a geodesic distance relationship matrix DM.

The geodesic distance relationship matrix DM is a matrix including components=dM(i, j) of i-th row and j-th column, and is a square matrix of N-th degree, since the number of input pattern images is N. Since dM(i, j)=dM(j, i) for the geodesic distances dM(i, j) as components, the geodesic distance relationship matrix DM becomes a symmetric matrix. In addition, since dM(i, i)=0, all diagonal components are "0".

Figure 3:
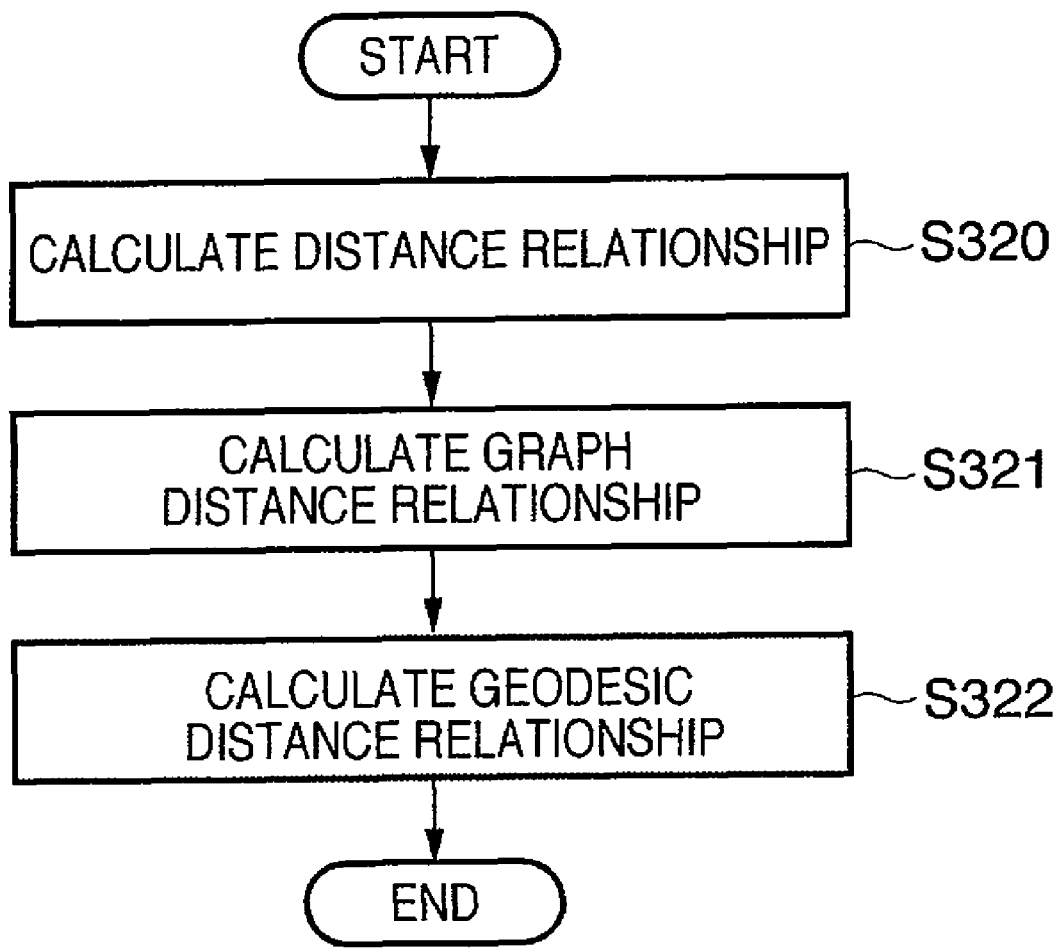
FIG. 3 is a flowchart showing the approximate geodesic distance calculation processing.

The geodesic distance is the shortest distance between data along the surface of the manifold defined by a large number of input data, as described above. The approximate calculation method of the geodesic distance in this embodiment will be described below with reference to the flowchart shown in FIG. 3. FIG. 3 is a flowchart showing the approximate geodesic distance calculation processing. Note that the processing according to the flowchart shown in FIG. 3 is executed by the geodesic distance relationship matrix generation unit 12.

In step S320, the geodesic distance relationship matrix generation unit 12 calculates a Euclidean distance relationship matrix Dx by calculating, for all combinations, a Euclidean distance dx(i, j) between arbitrary two points of the N pattern images. Note that dx(i, j) is an Euclidean distance between the i-th pattern image $x_i$ and j-th pattern image $x_j$.

The Euclidean distance relationship matrix Dx is a matrix including components=dx(i, j) of i-th row and j-th column, and is a square matrix of N-th degree and a symmetric matrix in which diagonal components are "0" as in the geodesic distance relationship matrix DM. In step S320, the Euclidean distance is used. However, the present invention is not limited to this, and other indices such as Minkowski distances such as a Manhattan distance and the like, statistical distances such as a Mahalanobis distance and the like, and so forth may be used as long as they satisfy a general axiom of distance such as symmetry, non-negativity, and the like.

In step S321, the geodesic distance relationship matrix generation unit 12 calculates, in turn, a graph distance relationship matrix DG by calculating, for all combinations, a graph distance dG(i, j) between arbitrary two points of the input N pattern images. Note that dG(i, j) is a graph distance between the i-th pattern image $x_i$ and j-th pattern image $x_j$.

Note that the graph distance yields dG(i, j)=dx(i, j) when the two points, i.e., the i-th pattern image $x_i$ and j-th pattern image $x_j$ are neighboring points, or dG(i, j)=∞ when these two points are not neighboring points. Since a practical calculation cannot use a numeric value "∞", a constant sufficiently larger than the Euclidean distance between arbitrary two pattern images may be used. The graph distance relationship matrix DG is a matrix including components=dG(i, j) of i-th row and j-th column, and is also a square matrix of N-th degree and a symmetric matrix in which diagonal components are "0".

As the determination method as to whether or not 2 points are neighboring points, in this embodiment, a pattern image included in k (k≧1) pattern images ((k+1) data including a self pattern image) except for that self pattern image in ascending order of distance calculated in step S320 from that self pattern image is determined as a neighboring pattern image. If pattern images at arbitrary two points are not determined as neighboring images at both the points, it is determined that these two points are not neighboring points. In this way, in this embodiment, k pattern images in ascending order of distance except for a self pattern image are determined as neighboring pattern images. Alternatively, for example, pattern images having a relationship of distance which is equal to or smaller than a positive value ϵ may be determined as neighboring pattern images. In this case, ϵ needs to assume a value large enough to determine at least one pattern image as a neighboring image except for a self pattern image in all pattern images. However, if ϵ is too large, since even a pattern image which is not determined as a neighboring image in practice is determined as a neighboring pattern image, it is not preferable to set too large a value. Although depending on the number of input pattern images and the like, ϵ normally assumes a value large enough to determine several pattern images as neighboring ones.

In step S322, the geodesic distance relationship matrix generation unit 12 calculates, for all combinations, the aforementioned geodesic distance dM(i, j) between arbitrary two points of the input N pattern images using a Floyd-Warshall method for the graph distance relationship matrix DG calculated in step S321. In this way, a geodesic distance relationship matrix DM is calculated. According to the Floyd-Warshall method, the geodesic distance dM(i, j) between the i-th pattern image and j-th pattern image is calculated by dM(i, j)=min{dG(i, j), dG(i, k)+dG(k, j)} for k≠i and j.

With the processes in steps S320 to S322, the geodesic distance relationship matrix DM can be calculated.

In step S23, an interclass separation degree setting unit 13 executes interclass separation degree setting processing. The processing executed by the interclass separation degree setting unit 13 will be described in detail below.

The interclass separation degree setting unit 13 sets an interclass separation degree v(cp, cq). Note that cp and cq are class labels. In this embodiment, since a pattern image set including classes of m persons is used, cp, cq∈{1, 2, . . . , m}, and there are m×m combinations for the interclass separation degree v(cp, cq). This interclass separation degree v(cp, cq) represents a separation expression degree between classes cp and cq, and is set according to a desired separation degree between these classes. More specifically, when the separation degree is to be increased, the interclass separation degree is set to be larger than 1; otherwise, it is set to be smaller than 1. When the separation degree need not be particularly changed, the interclass separation degree is set to be 1. The separation degree in this case means an emphasis degree of a difference between classes, as described above. For example, when the difference between classes cp and cq is to be emphatically expressed, the interclass separation degree v(cp, cq) between these two classes is set to be larger than 1.

As in this definition, the interclass separation degree meets symmetry v(cp, cq)=v(cq, cp) since it is set based on the relationship between two commutative classes. The interclass separation degree v(cp, cp) between identical classes is arbitrary, and it may be simply set to be 1, since it is not used in practice.

The method of setting the interclass separation degree in this embodiment will be described below. In this embodiment, in order to promote separation expression of respective classes, the interclass separation degree between similar classes is set to be larger than 1, and that between non-similar classes is set to be 1 by the following method.

In all combinations that select two out of all classes, whether or not these two classes are similar to each other is determined. Various determination methods as to whether or not the two classes are similar to each other are available. In this embodiment, a distance between two classes is calculated using the nearest neighbor method which is popular in cluster analysis, and when the distance between the two classes is smaller than a threshold, it is determined that these two classes are similar to each other. The interclass separation degree between the two classes which are determined to be similar to each other is set to be larger than 1. In this embodiment, more specifically, a value obtained by dividing the threshold by the calculated distance between the classes is set as an interclass separation degree. Since the distance between the classes which are determined to be similar to each other is smaller than the threshold, this value certainly becomes larger than 1. The interclass separation degree between two classes which are not determined to be similar to each other is set to be 1.

As for the threshold, a value with which it is determined that faces of similar persons like brothers and the like are similar to each other is empirically calculated, and that value can be used. In this embodiment, the distance between classes is calculated using the nearest neighbor method, but other methods of calculating the distance between classes such as a farthest neighbor method, group average method, centroid method, median method, Ward method, flexible method, and the like may be used.

Furthermore, as the interclass-separation degree between similar classes, the value obtained by dividing the threshold by the calculated distance between the classes is set. However, other setting methods may be used as long as they set a value larger than 1 (e.g., a method of setting a value equal to or larger than 1).

As described above, in this embodiment, the interclass separation degree is set based on the distance between classes. However, the present invention is not limited to this, and the interclass separation degree may be set based on information which is given in advance to each class label. For example, if information indicating that Mr. A and Mr. B are twins is given, the interclass separation degree between two classes "Mr. A" and "Mr. B" may be set to be an appropriate value larger than 1.

The setting method of the interclass separation degree is not limited to that of enhancing the interclass separation degree between similar classes, and other setting methods may be used. For example, when predetermined class cp is to be expressed to be specifically separated from another class cq (q≠p), a setting method of setting all of v(cp, cq)[∀q, q≠p] to be values larger than 1, and setting others to be 1 may be used. When classes cp and cq need not to be specifically distinguished from each other, a setting method setting only v(cp, cq) to be a value smaller than 1, and setting others to be 1 may be used. In this way, in the data expression method described in this embodiment, the interclass separation degree can be arbitrarily set in accordance with a desired separation degree between classes.

In step S24, a geodesic distance relationship matrix updating unit 14 calculates a distorted geodesic distance $d_d(i, j)$, and calculates a distorted geodesic distance relationship matrix Dd.

Note that $d_d(i, j)$ is a distorted geodesic distance between the i-th pattern image $x_i$ and j-th pattern image $x_j$, which is calculated by the geodesic distance relationship matrix generation unit 12. The distorted geodesic distance $d_d(i, j)$ is obtained by updating the geodesic distance dM(i, j) between the i-th pattern image $x_i$ and j-th pattern image $x_j$ based on labels $y_i$ and $y_j$ and an interclass separation degree $v(y_i, y_j)$.

In this embodiment, this distorted geodesic distance $d_d(i, j)$ is calculated by $d_d(i, j) = dM(i, j) \cdot [v(y_i, y_j) - \{v(y_i, y_j) - \beta\} \cdot \delta y_i, y_j]$. Note that δi,j is the Kronecker's δ: δi,j=1 when i=j or δi,j=0 when i≠j. The coefficient β is a positive number smaller than 1. That is, the distorted geodesic distance $d_d(i, j) = \beta \cdot dM(i, j)$ when the i-th data $x_i$ and j-th data $x_j$ have an identical label, i.e., they belong to an identical class, and it is smaller than the geodesic distance dM(i, j).

On the other hand, when these data do not have an identical label, i.e., they belong to different classes, $d_d(i, j) = dM(i, j) \cdot v(y_i, y_j)$. Therefore, the distorted geodesic distance $d_d(i, j)$ is expressed by multiplying the geodesic distance dM(i, j) by the interclass separation degree $v(y_i, y_j)$.

As for the coefficient β to be multiplied when two data belong to an identical class, a value that satisfies the following condition is calculated, and that value is set. This condition is to satisfy $d_d(i, j) = \beta \cdot dM(i, j) < d_d(i, c) = dM(i, c) \cdot v(y_i, y_c)$ between arbitrary two pattern images $x_i$ and $x_j$ which belong to an identical class and an arbitrary pattern image $x_c$ which belongs to a class different from that of these two pattern images. That is, the distorted geodesic distance between two pattern images which belong to an identical class is set to be smaller than that to an arbitrary pattern image which belongs to a different class. Ultimately, by setting β=0, the above relation can always be satisfied. However, since such setting is likely to cause a trouble in the processing of a data mapping relationship generation unit 15 (to be described later), a value which meets β>0 is set.

In the data expression method according to this embodiment, the distance relationship between pattern images is updated so that the distance between pattern images which belong to an identical class becomes smaller than that to a pattern image which belongs to another class, as described above. Under that condition, the distance between pattern images which belong to different classes is updated based on the set interclass separation degree. In this way, the distance relationship in which continuous variations of pattern images in a class, e.g., non-linear, continuous variations on an original feature space (e.g., if a pattern image is an image of "human face", it changes from a face-on image to an image in profile) are clumped in the axial direction of variations can be built. In this embodiment, the distance relationship between pattern images which belong to the identical class is updated by multiplying the distance between the pattern images which belong to the identical class by the coefficient β.

However, the updating method of the distance relationship between pattern images is not limited to this, and other updating methods may be used as long as they can set the distance between pattern images which belong to an identical class to be smaller than that to a pattern image which belongs to a different class. For example, the distances between all pattern images which belong to an identical class may be updated to a constant ρ smaller than the distance to a pattern image which belongs to a different class.

In step S25, a data mapping relationship generation unit 15 calculates output vectors $z_i$ as mapping destinations corresponding to all pattern images $x_i$ using the distorted geodesic distance relationship matrix Dd calculated by the geodesic distance relationship matrix updating unit 14.

In the following description, an output vector $z_i$ corresponding to the i-th pattern image $x_i$ calculated by the data mapping relationship generation unit 15 is described as the i-th output vector $z_i$. Note that the output vector is calculated so that a Euclidean distance dz(i, j) between the i-th output vector $z_i$ and j-th output vector $z_j$ is approximation of the distorted geodesic distance $d_d(i, j)$ between the i-th pattern image $x_i$ and j-th pattern image $x_j$. In this embodiment, as in Isomap described above, such output is calculated using multidimensional scaling (MDS) (see article 1 for the calculation method of an output vector using MDS).

Normally, upon using MDS for the purpose of visualization, an output vector of three or lower dimensions is used. However, since the data expression method according to this embodiment does not particularly aim at visualization, an output vector of four or more dimensions may be used. When an output vector of very higher dimensions is used, approximation of the distance can be relatively strictly made. However, for the purpose of data redundancy reduction, the dimensions of an output vector are set to be smaller than those of input data (pattern image) (400 dimensions in this embodiment) as much as possible.

Hence, in this embodiment, an output vector is calculated to have minimum dimensions for which a maximum distance error ratio of those of pairs of all input pattern images is equal to or smaller than a predetermined value. Note that the distance error ratio between th i-th data and j-th data is given by $|d_d(i, j)-dz(i, j)|/d_d(i, j)$. An allowable range of the maximum distance error ratio used in this case can be set to be 10% or less although it depends on the category of input pattern images and the like. In this embodiment, minimum dimensions for which the maximum distance error ratio becomes equal to or smaller than the predetermined value are used as the dimensions of the output vector. However, the present invention is not limited to this. For example, minimum dimensions for which, for example, the sum total of distance error ratios becomes equal to or smaller than a pre-set value may be used as the dimensions of the output vector.

With the processes in the respective units from the data input unit 10 to the data mapping relationship generation unit 15 described above, a correspondence relationship "~$x_i \to x_i \to z_i$" for labeled pattern images can be obtained. In this way, for all pattern images, the output vectors $z_i$ approach each other between pattern images which belong to an identical class on a space of the dimensions of the output vectors $z_i$, in which the redundancy is reduced. That is, a data set of an identical class is expressed as one cluster, and clusters corresponding to respective classes can be expressed to have desired separation degrees.

The data mapping relationship generation unit 15 then stores information indicating the correspondence relationship "~$x_i \to x_i \to z_i$" calculated for respective labeled image in a memory 16. Such information storage method is not particularly limited. For example, a file which associates file names of ~$x_i$, $x_i$, and $z_i$ with each other in this order may be created.

In this embodiment, as pattern images, grayscale images obtained by extracting human facial regions and labels, which indicate who they are, are used. However, the present invention is not limited to this. For example, in place of pattern images, audio data obtained by pronouncing pre-set words and data having those words as labels may be used. Furthermore, Web pages described in HTML and labels indicating their categories may be used. That is, this embodiment can be applied to any other data as long as an arbitrary distance that reflects similarity can be defined between labeled original data.

Second Embodiment

This embodiment applies the data expression method described in the first embodiment. In this embodiment, a pattern image, as an extracted image (pattern image) and a grayscale image, which is obtained by extracting a facial region from an original image including a human face and has a size of 20 pixels in the vertical direction×20 pixels in the horizontal direction, is input, and a person included in this input pattern image is identified. Of course, the input pattern image does not undergo any labeling processing described in the first embodiment.

This embodiment includes two modes, i.e., a learning mode and identification mode.

In the learning mode, a data mapping relationship is approximately built using pattern images handled in the first embodiment, i.e., labeled pattern images, and models of classes corresponding to respective labels are generated on a mapping destination space.

In the identification mode, a pattern image which does not undergo any-labeling processing is mapped using the data mapping relationship learned in the learning mode. Then, on the mapping destination space, with whom facial image the mapped image matches is identified using the models of the classes corresponding to the respective labels.

<Learning Mode>

Figure 4:
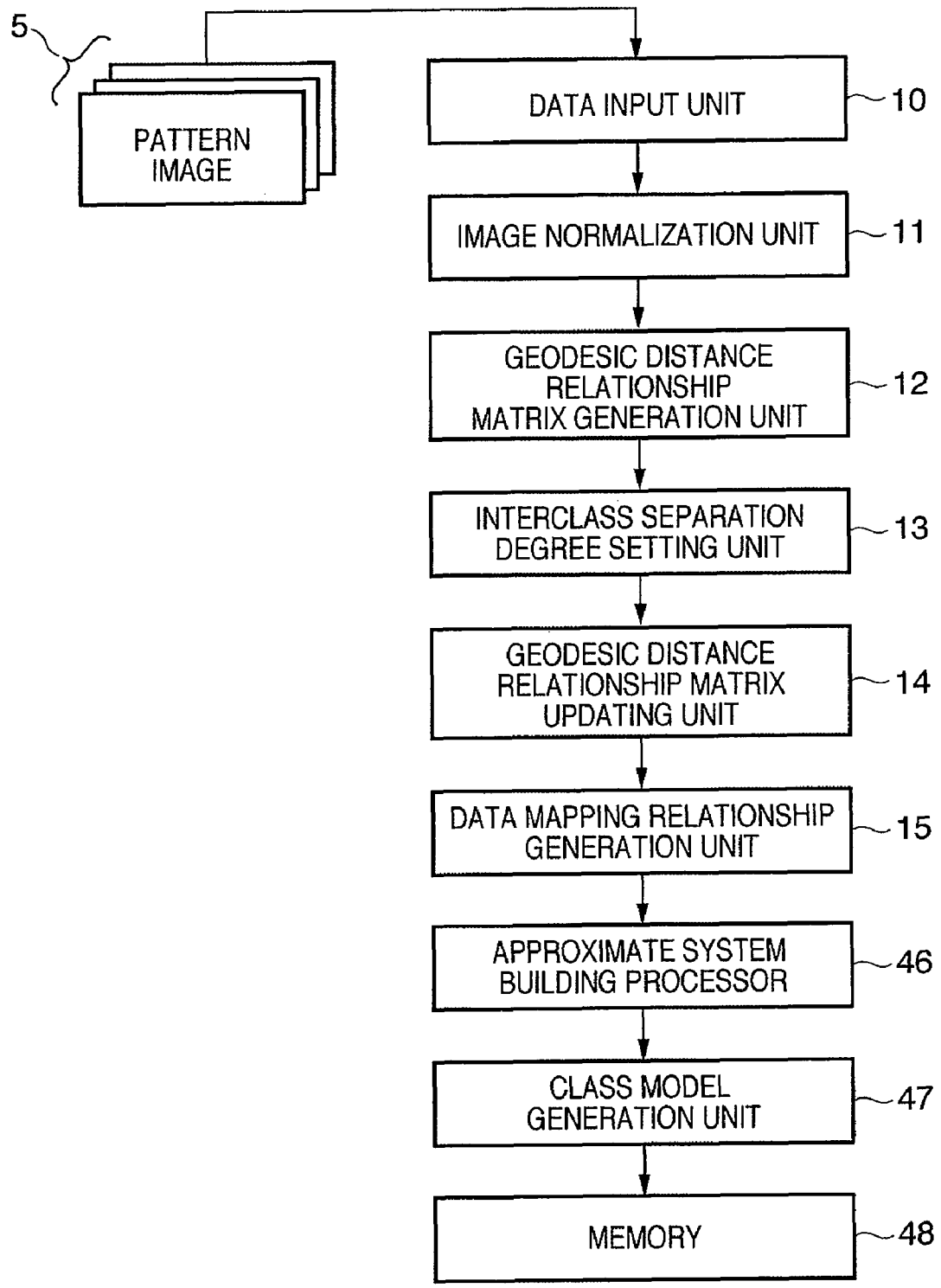
FIG. 4 is a block diagram showing the functional arrangement of respective units which operate in a learning mode of those which configure an information processing apparatus according to the second embodiment of the present invention.

FIG. 4 is a block diagram showing the functional arrangement of only units which are operated in the learning mode of those which configure an information processing apparatus according to this embodiment. Note that the same reference numerals in FIG. 4 denote components common to those shown in FIG. 1, and a repetitive description thereof will be avoided.

Figure 5:
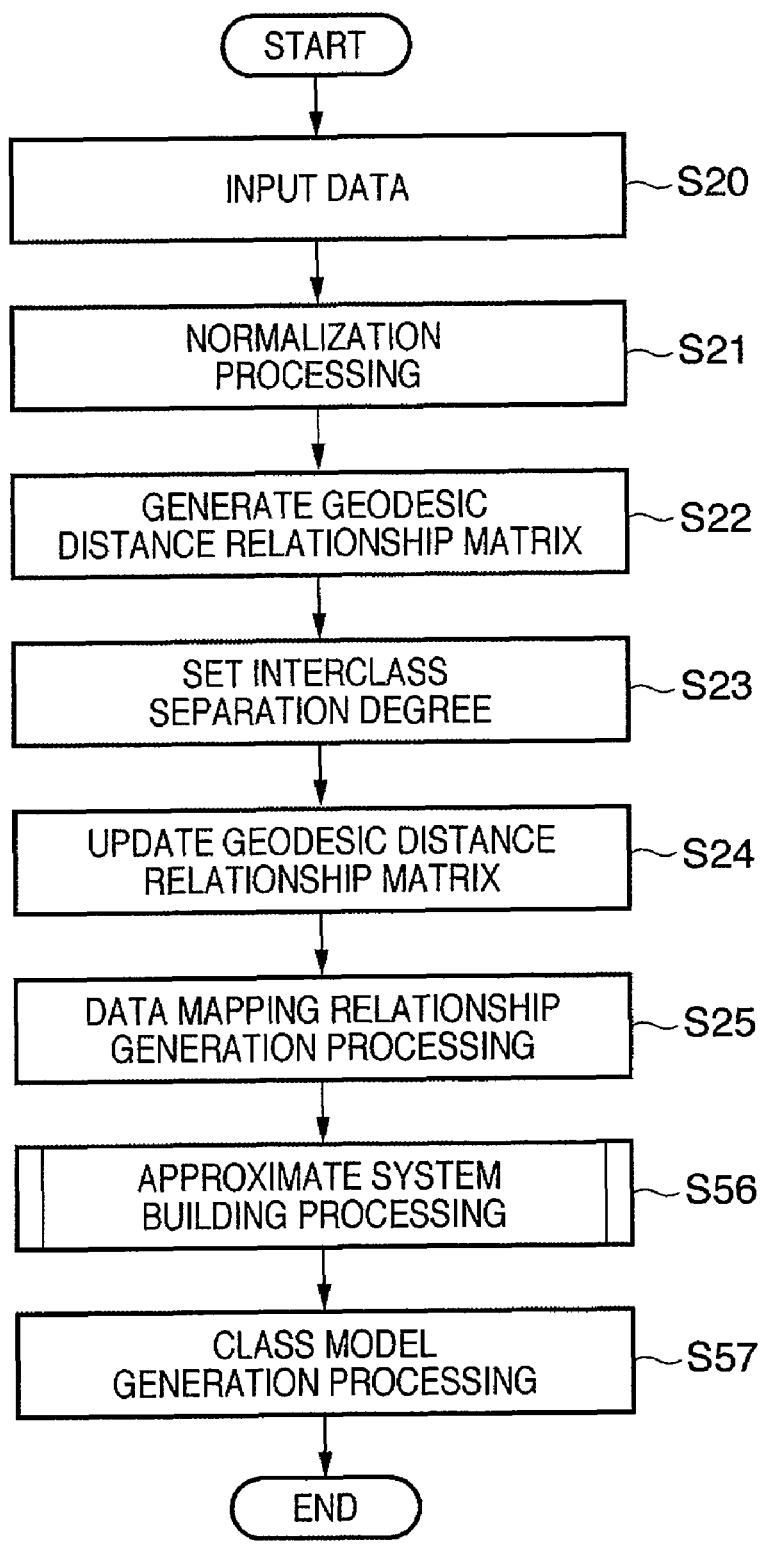
FIG. 5 is a flowchart of processing executed in the learning mode by the information processing apparatus according to the second embodiment of the present invention.

FIG. 5 is a flowchart of processing executed in the learning mode by the information processing apparatus according to this embodiment. Note that the same step numbers in FIG. 5 denote steps common to those shown in FIG. 2, and a repetitive description thereof will be avoided.

The processing in the learning mode will be described below with reference to FIGS. 4 and 5.

In this embodiment, N pattern images (which are the same as those handled in the first embodiment, and are labeled pattern images) are input, and the same processing as in the first embodiment is applied to the respective input pattern images. As a result, output vectors (assume that the number of dimensions of each output vector is h in this embodiment) for the respective pattern images are calculated. The processes described so far are the same as those in the first embodiment, and a repetitive description thereof will be avoided.

With the processes up to a data mapping relationship generation unit 15, a data set (training data set) including three data, i.e., a label $y_i$, normalized vector $x_i$, and output vector $z_i$ for arbitrary i of i=1, 2, . . . , N is obtained. Using these training data sets, an approximate system building processor 46 builds a system which approximates mapping "$x_i \to z_i$". In this embodiment, as this system that approximates mapping, a three-layer feedforward neural network (three-layer NN) is used.

This three-layer NN has a three-layered structure, i.e., an input layer, middle layer, and output layer, and each of these layers has a plurality of neurons.

The number of neurons of the input layer is 400, which is the same as the number of dimensions of the normalized vector, and these neurons of the input layer have element values of a 400-dimensional vector as input data to the three-layered NN as status values.

The number of neurons of the middle layer is determined by the processing of the data mapping relationship generation unit 15, and these neurons of the middle layer are connected to all the neurons of the input layer.

Note that connection has a certain weight, and a value obtained by multiplying a status value of a source neuron (a neuron of the input layer for that of the middle layer) by that weight is received. The neuron of the middle layer calculates the sum total of all received inputs, and applies pre-set non-linear conversion to a value obtained by subtracting a pre-set value (threshold) from the sum total to obtain its status value. As these weight values and threshold, random values are set in an initial state, and values are settled by processing of the approximate system building processor 46 (to be described later). As the non-linear conversion, conversion using a so-called sigmoid function is popularly used. In this embodiment, as the non-linear conversion, a hyperbolic tangent function (f(u)=tan h(u)) is used.

The number of neurons of the output layer is the same as the number of dimensions of the output vector, and these neurons of the output layer are connected to all the neurons of the middle layer. The number of dimensions of the output vector is determined by the processing of the data mapping relationship generation unit 15, as described above. In this case, since the number of dimensions of the output vector is h, as described above, the number of neurons of the output layer is also h.

Each neuron of the output layer receives as an input a value obtained by multiplying the status value of a source neuron (that of the middle layer) by a weight for each connection, as in the neurons of the middle layer. The neuron calculates the sum total of all the received inputs, and subtracts a threshold from the sum total to obtain a status value, i.e., an output value. In this way, unlike the neurons of the middle layer, the neurons of the output layer do not execute any non-linear conversion.

As for the weight values of connection from the neurons of the middle layer and the threshold, random values are set in an initial state, and their values are settled by the processing of this approximate system building processor 46, as in the neurons of the middle layer.

By setting element values of a 400-dimensional vector as status values of the 400 neurons of the input layer using an arithmetic system of the three-layer structure (to be simply referred to as "input to the three-layer NN" hereinafter), the status values of the h neurons of the output layer are obtained. By considering the status values of the h neurons as element values of an h-dimensional vector, the arithmetic operation using this three-layer NN can be considered as execution of mapping from the 400-dimensional vector to the h-dimensional vector.

As is well known, by variously changing the weight values of connection and thresholds, as described above, an arbitrary mapping relationship can be approximated at an arbitrary precision, although it depends on the number of neurons of the middle layer. Hence, this embodiment approximates, using this three-layer NN, a mapping relationship "$x_i \rightarrow z_i$" for arbitrary i of the training data sets, i.e., a mapping relationship from the normalized vector to the output vector by adjusting the weight values of connection and thresholds.

In step S56 in FIG. 5, the approximate system building processor 46 executes processing for building a system that approximates the mapping relationship.

Figure 6:
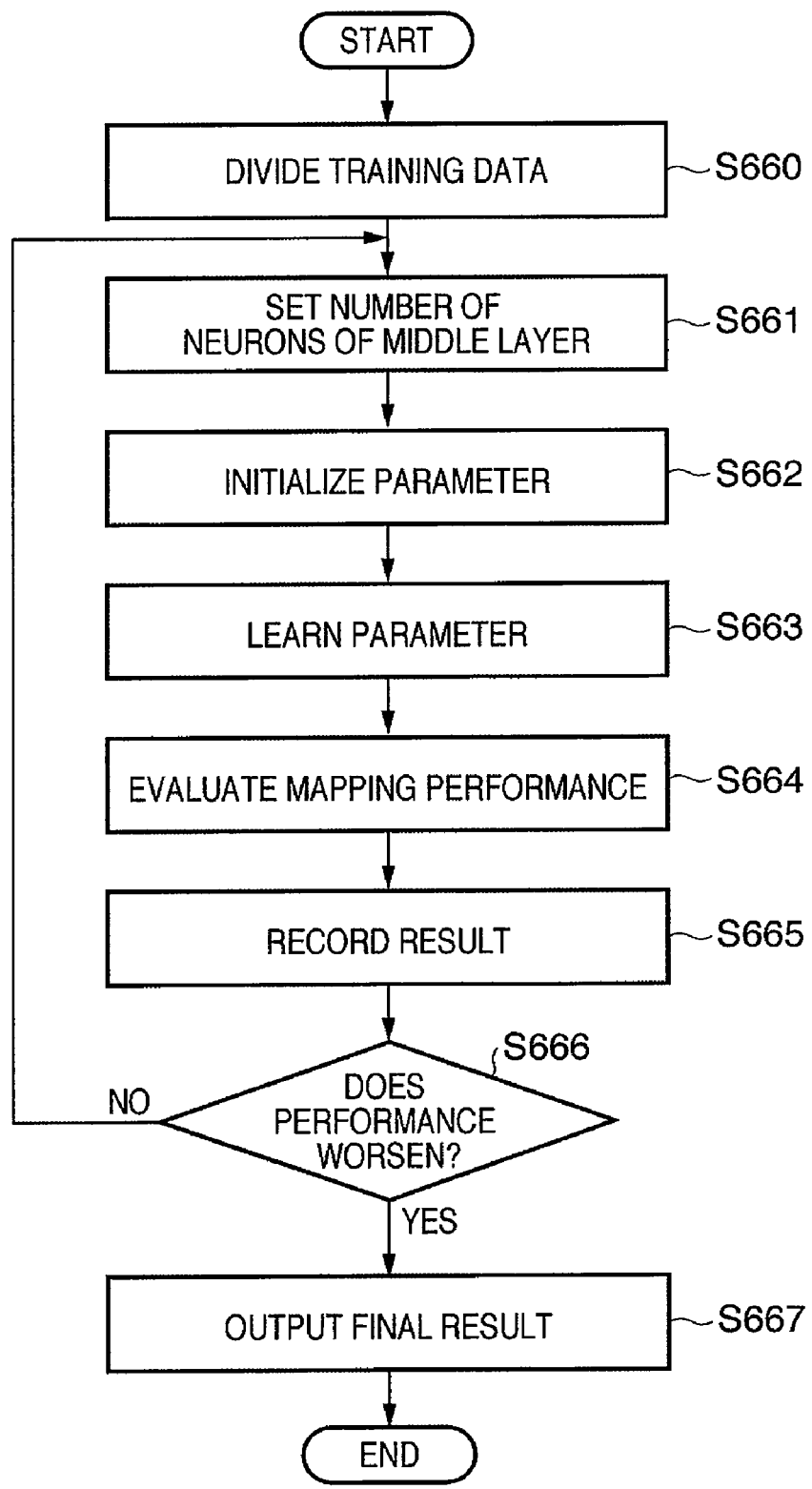
FIG. 6 is a flowchart of processing executed by an approximate system building processor 46 in step S56.

The processing to be executed by the approximate system building processor 46 in step S56, i.e., adjustment of the weight values of connection and thresholds of the three-layer NN and decision of the number of neurons of the middle layer will be described below with reference to FIG. 6 which shows the flowchart of that processing.

In step S660, the approximate system building processor 46 divides the aforementioned training data sets (N data sets each including the label, normalized vector, and output vector) obtained by the processing up to the data mapping relationship generation unit 15 in two sets. Of these two sets, one data set is used for adjustment of the weight values of connection and thresholds, and this set will be referred to as an adjustment set hereinafter. The other set is used for verification in step S664 to be described later, and this set will be referred to as a validation set hereinafter.

Upon division, M out of N training data sets (0<M<N) are randomly selected as the validation set. The remaining (N−M) sets are used as the adjustment set. The value M is arbitrary, but it is set to be 30% of N in this embodiment. Note that both these two sets preferably include at least one data of each of all labels. Hence, in this embodiment, if either set does not include any data of a certain label, random selection is redone.

In step S661, the approximate system building processor 46 sets the number of neurons of the middle layer. Initially, the processor 46 sets the number of neurons of the middle layer to be a predetermined value. If the process returns to step S661 again after checking step S666 to be described later, the processor 46 increments the number of neurons of the middle layer by one. The number of neurons of the middle layer to be initially set is arbitrary, and an initial value is preferably set to be as small as possible. Hence, in this embodiment, the initial number of neurons of the middle layer is 2.

In step S662, the approximate system building processor 46 initializes all the weight values of connection and thresholds to random values. In this case, in order to eliminate initial value dependency in the processing of subsequent step S663, all values are preferably set to be small values that can be considered as nearly zero.

In step S663, the approximate system building processor 46 starts adjustment of the weight values of connection and thresholds using the adjustment set starting from those initialized in step S662, and builds a three-layer NN which approximates mapping from the normalized vector to the output vector in the adjustment set. In this case, the processor 46 adjusts the weight values of connection and thresholds so that when each of all the normalized vectors in the adjustment set is input to the three-layer NN, the status values of the h neurons of the output layer become close to respective element values of the corresponding output vector. This adjustment uses a back propagation method which is popular as a learning method of a multilayer feedforward neural network.

Please refer to S. Haykin, "Neural Networks A Comprehensive Foundation 2nd Edition", Prentice Hall, pp. 156-255, July 1998 for details of the adjustment method of the weight values of connection and thresholds.

The approximate system building processor 46 ends this adjustment when an error between the status values of the h neurons of the output layer obtained upon inputting each of all the normalized vectors in the adjustment set to the three-layer NN, and the element values of the corresponding output vector converges. This embodiment uses, as this error, the sum total of mean square errors of the status values of the h neurons of the output layer and the element values of the corresponding output vector.

Whether or not the error converges is determined as follows. That is, in the adjustment processes repeated as many as the pre-set number of steps, when the error nearly ceases to decrease (for example, when the ratio of decrease in error is 1% or less), it is determined that the error converges. "The pre-set number of steps" used in determination may be arbitrarily set.

If this value is too small, convergence is more likely to be erroneously determined although the error does not converge yet in practice. However, if this value is too large in turn, since convergence is unlikely to be determined, the value that surely allows convergence determination may be empirically decided and set.

With the aforementioned processing in step S663, building of a three-layer NN which approximates mapping from the normalized vector to the output vector in the adjustment set using the three-layer NN when the number of neurons of the middle layer assumes the value set in step S661 is completed.

In step S664, the approximate system building processor 46 evaluates the mapping performance of the three-layer NN built in step S663 using the validation set. In this case, the processor 46 inputs each of all the normalized vectors in the validation set to the three-layer NN built in step S663, and obtains the status values of the h neurons of the output layer in correspondence with each input. Then, the processor 46 calculates the sum total of mean square errors between the obtained h status values, and the element values of the output vector in the validation set, which corresponds to the input normalized vector. As this sum total of mean square errors is smaller, it is determined that the performance for executing desired mapping to unknown normalized data is high. Hence, the processor 46 uses this sum total of mean square errors as the evaluation value of the mapping performance of the three-layer NN built in step S663. That is, as this evaluation value is smaller, higher mapping performance is determined.

In step S665, the approximate system building processor 46 records the number of neurons of the middle layer by one, and all the weight values of connection and thresholds of the three-layer NN built in step S663, and the evaluation value of the mapping performance calculated in step S664 in its internal memory as data.

The approximate system building processor 46 checks in step S666 using the evaluation values recorded in the memory so far if the mapping performance of the three-layer NN worsens. As a result of checking, if it is determined that the mapping performance worsens, the process advances to step S667. On the other hand, if it is determined that the mapping performance does not worsen, the process returns to step S661 to increment the number of neurons of the middle layer by one, as described above, and to execute the processes in step S662 and subsequent steps.

In step S666, when all the subsequent evaluation values of the three-layer NN are worse than that of the three-layer NN recorded in step S665 obtained by the processing as many as the pre-set number of steps before, i.e., the sum totals of mean square errors are larger, it is determined that the mapping performance worsens. If the "pre-set number of steps" is too small, it is more likely to erroneously determine whether or not the mapping performance worsens. Hence, the "pre-set number of steps" may be set to be a practically large value. In an early stage, since no evaluation values obtained by the process before the pre-set number of steps is available, worsening cannot be determined. In this case, the process returns to step S661.

In step S667, the approximate system building processor 46 selects the smallest one of the evaluation values of the mapping performance recorded in step S665. The processor 46 then outputs the number of neurons of the middle layer, and all the weight values of connection and thresholds recorded in step S665 together with the selected evaluation value to a class model generation unit 47 (to be described later).

With the processes from step S660 to step S667 described above, the three-layer NN having the appropriate number of neurons of the middle layer can be built as a system which has high generalization capability and approximates mapping from the normalized vector to the output vector.

In this embodiment, the three-layer NN that approximates mapping from the normalized vector to the output vector is built using the aforementioned method. However, this embodiment is not limited to this, but other general three-layer NN building methods may be used. Furthermore, this embodiment uses the three-layer NN as a system that approximates mapping from the normalized vector to the output vector, but this embodiment is not limited to this. For example, non-linear mapping systems such as a feedforward neural network of three or more layers, support vector regression method using a Kernel method, and the like may approximate the non-linear mapping.

In step S57, the class model generation unit 47 generates class models corresponding to respective labels using the three-layer NN built in the processing of the approximate system building processor 46, and the training data sets. The class models to be generated in this step are used in the identification mode to be described later, and corresponds to parameter generation of an identifier used to execute class identification on a mapping destination space by the three-layer NN. For example, in the identification mode, upon executing class identification using a linear identification function, a coefficient vector wc and bias value bc (c is a class label) of the linear identification function may be generated.

In this embodiment, since class identification in the identification mode uses the nearest neighbor method, at least one prototype data is generated for each class. More specifically, the normalized vector in the training data sets is input to the built three-layer NN, and the status values of the h neurons of the output layer of the three-layer NN at that time are calculated. Then, the class model generation unit 47 executes processing for recording, as prototype data, a set of an h-dimensional mapped vector having these status values as respective element values and a corresponding label, i.e., data after mapping by the three-layer NN and its label in a memory 48. This prototype data recording processing may be executed for data randomly selected from the training data sets, but it is executed for all data in this embodiment.

With the aforementioned processing, the three-layer NN built by the processing of the approximate system building processor 46 and a plurality of prototype data recorded by the class model generation unit 47 are obtained, thus ending the processing in the learning mode. That is, in the learning mode, a system which maps input data on a space in which the redundancy is reduced, the data approach each other if they belong to an identical class, and the interclass separation degree becomes a desired separation degree, and which approximates that mapping is built. At the mapping destination, models of respective classes are generated.

<Identification Mode>

Figure 7:
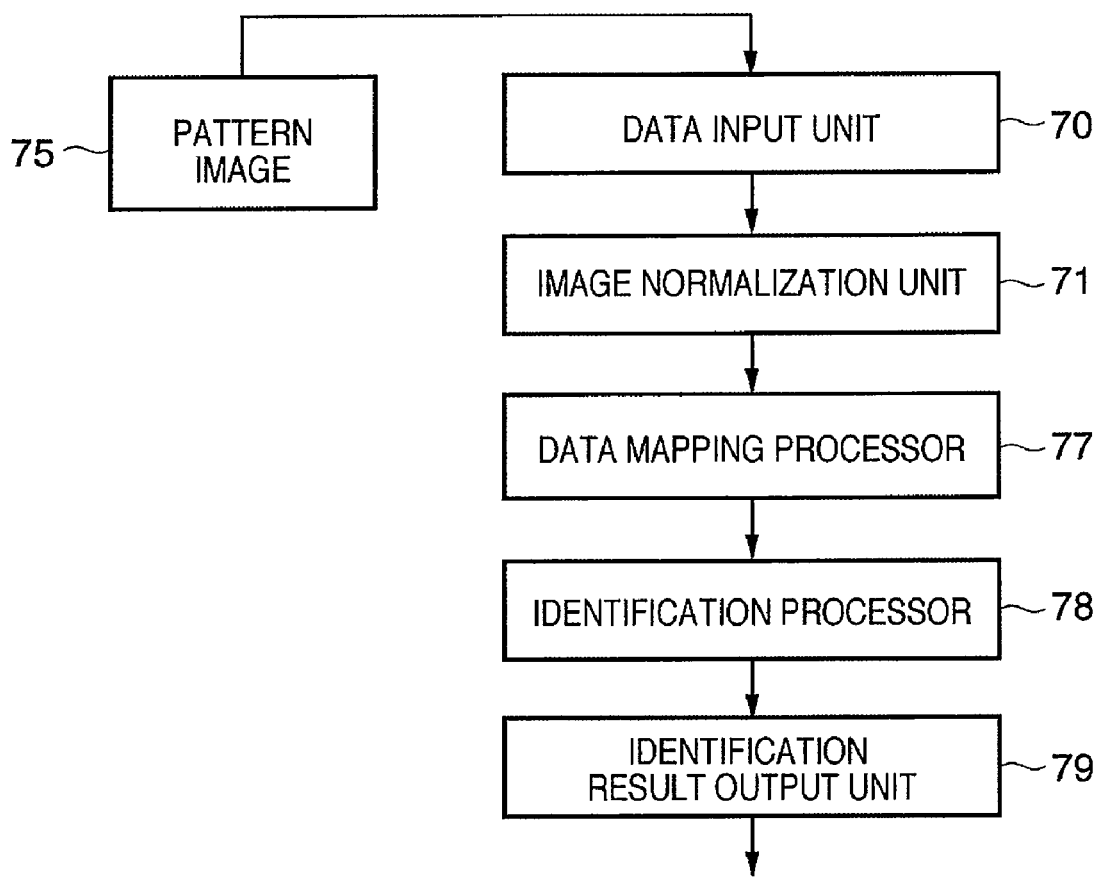
FIG. 7 is a block diagram showing the functional arrangement of respective units which operate in an identification mode of those which configure the information processing apparatus according to the second embodiment of the present invention.

FIG. 7 is a block diagram showing the functional arrangement of only respective units which operate in the identification mode of those which configure the information processing apparatus according to this embodiment.

Figure 8:
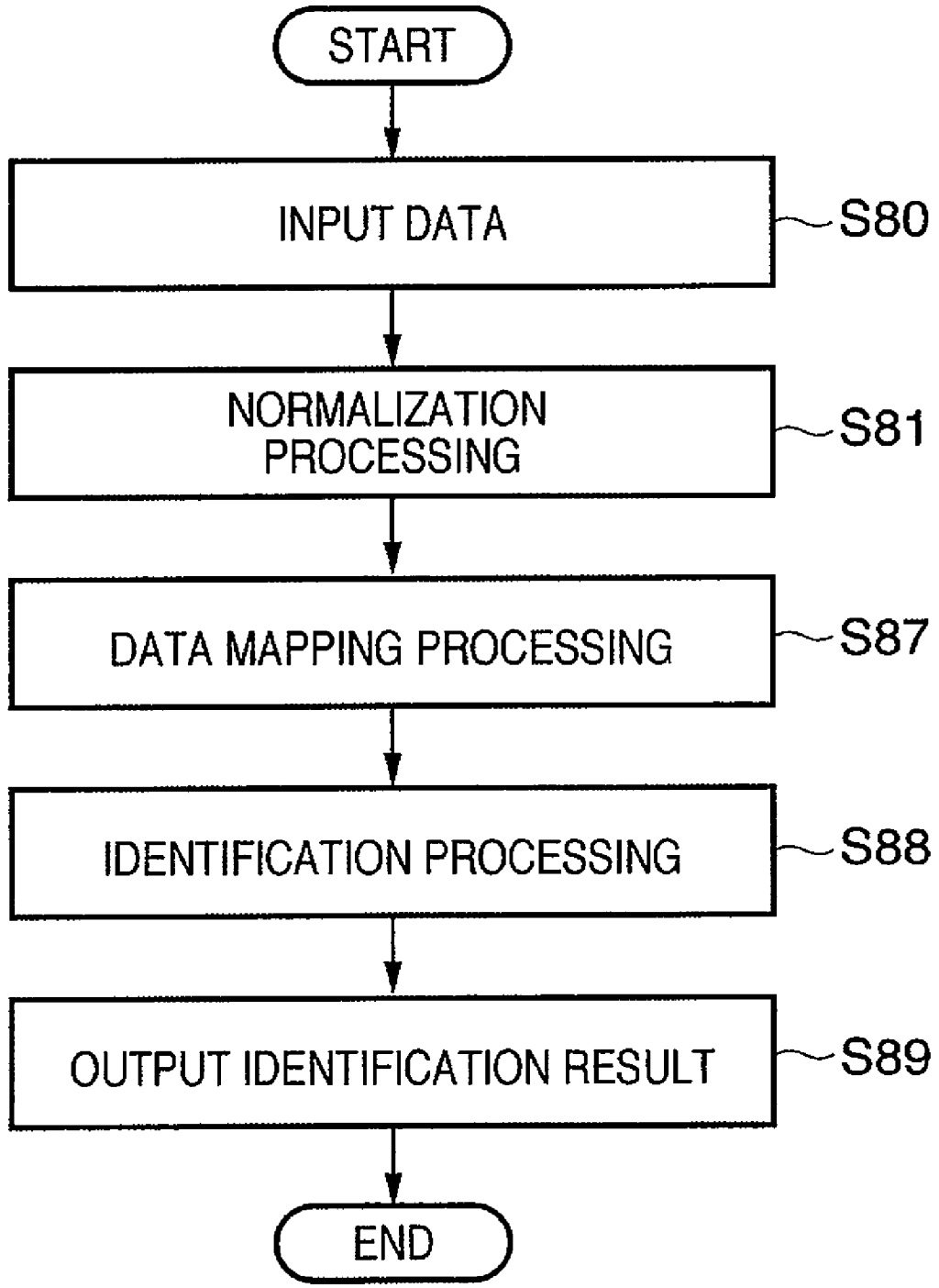
FIG. 8 is a flowchart of processing executed in the identification mode by the information processing apparatus according to the second embodiment of the present invention.

FIG. 8 is a flowchart of processing executed by the information processing apparatus according to this embodiment in the identification mode.

The processing in the identification mode will be described below with reference to FIGS. 7 and 8.

In step S80, a data input unit 70 inputs a pattern image 75 (a pattern image which does not undergo labeling processing) as an object to identify whose image it is.

In step S81, an image normalization unit 71 applies the same image normalization processing as in the image normalization unit 11 described in the first embodiment to the pattern image 75, and generates a 400-dimensional vector by sorting respective pixels of the normalized image in a raster scan order. The vector obtained in this step will be referred to as a normalized vector x hereinafter.

In step S87, a data mapping processor 77 calculates a mapped vector z using the three-layer NN obtained in the learning mode. The mapped vector z is an h-dimensional vector which has, as the respective element values, status values of h neurons of the output layer of the three-layer NN obtained by inputting the normalized vector x to the three-layer NN obtained in the learning mode.

In step S88, an identification processor 78 calculates Euclidean distances between the mapped vector z calculated by the data mapping processor 77, and those of all the prototype data recorded in the learning mode, so as to attain class identification using the nearest neighbor method. The identification processor 78 selects the mapped vector corresponding to the smallest calculated distance, and obtains a label recorded in correspondence with that vector.

In step S89, an identification result output unit 79 outputs information indicating a class of person corresponding to the label obtained by the identification processor 78. The class of person corresponding to the label may be held in advance in an internal memory of the identification result output unit 79 as a table. That information is not particularly limited. For example, text data that describes information associated with a person such as a name of a person or the like may be used. Alternatively, audio data that makes the information processing apparatus of this embodiment pronounce a name of a person may be used. In this case, the information processing apparatus needs to have an arrangement for generating an audio signal-based on this audio data, and a loudspeaker for outputting an audio according to this audio signal.

With the aforementioned processing, the processing for identifying whose face image it is based on a pattern image to be identified can be executed. Since this embodiment assumes that an input pattern image (facial image) is that of a person included in the data used in advance in the learning mode, the identification result indicates any of persons included in the data used in the learning mode. If an image of a person which is not included in the data used in the learning mode is input, when the smallest distance calculated by the identification processor 78 is equal to or larger than a pre-set value, an identification result indicating an image of an unknown person may be output. The "pre-set value" used in this case may be empirically calculated to determine an image of an unknown person by inputting that of the person which is not included in the data.

With the processing of the learning mode and identification mode described above, processing for inputting a pattern image which is not given with any label and identifying a person who matches that image can be executed. In this embodiment, the identification processing by the identification processor 78 in the identification mode uses the nearest neighbor method. However, this embodiment is not limited to such specific method, and can be implemented using other popular identification methods such as a k-nearest neighbor method, support vector machine, and the like. In this case, the processing for generating models of respective classes in the class model generation unit 47 in the learning mode may be replaced by processing such as learning of so-called parameters, acquisition of data, or the like, which is required in the identification processing to be used.

In this way, in the pattern identification method according to this embodiment, the data mapping system which sets the distance between data which belong to an identical class to be shorter than that to data which belongs to a different class, and expresses the interclass relationship using a desired separation degree is built. Then, the identifier which executes class identification on a mapping destination space mapped by this built data mapping system is generated. By mapping new input data using this data mapping system, and identifying the mapped data using the generated identifier, pattern identification which has identification characteristics according to the desired interclass separation degree and is robust against essentially non-linear variations of data can be implemented.

When the interclass separation degree is set by the same method as in the first embodiment, the separation degree between similar classes is emphasized. Hence, the identification characteristics that emphasize the separation degree between similar classes can be obtained. Such characteristics are implemented since the mapping system onto a space that emphasizes the difference between similar classes is built. In this way, a satisfactory identification result can be obtained even for an object which is relatively hardly identified.

Various identification characteristics can be obtained by the setting method of the interclass separation degree described in the first embodiment. For example, when the interclass separation degree between class cp and another class cq ($q \neq p$) is set to be a value larger than 1, and other interclass separation degrees are set to be 1, the probability of erroneously determining newly input data of class cq ($q \neq p$) as class cp can be reduced.

The aforementioned characteristics are effective upon building, e.g., a robust security system using facial images. More specifically, by handling the class of a person having top authority like class cp, the possibility of determining a general person as the person having the top authority can be reduced, and a highly reliable security system can be built. In consideration of a similar security system, even when persons who have nearly equal authorities are determined to take one person for another, there are no ill effects. For this reason, since the classes of such persons need not be specifically distinguished, the interclass separation degree may be set to be a value smaller than 1. With this setting, the separation degree between classes with different authorities can be relatively increased, and the probability of determining persons having different authorities so as to take a given person for another can be reduced. As described above, with the pattern identification method according to this embodiment, a pattern identification method having desired identification characteristics can be implemented by setting interclass separation degrees.

Third Embodiment

This embodiment will explain an example of a pattern identification method which inputs a pattern image that does not undergo any labeling processing and identifies who is a person that matches the image in the same manner as in the second embodiment, as a modification of the pattern identification method described in the second embodiment.

This embodiment includes a learning mode and identification mode as in the second embodiment. The processes to be executed in these modes in this embodiment are the same as those in the second embodiment, except that the processes corresponding to the data mapping relationship generation unit 15, the approximate system building processor 46, the class model generation unit 47, and the data mapping processor 77 are different. For this reason, only these different processes will be explained hereinafter, and a description of the same processes will not be repeated.

<Learning Mode>

Figure 9:
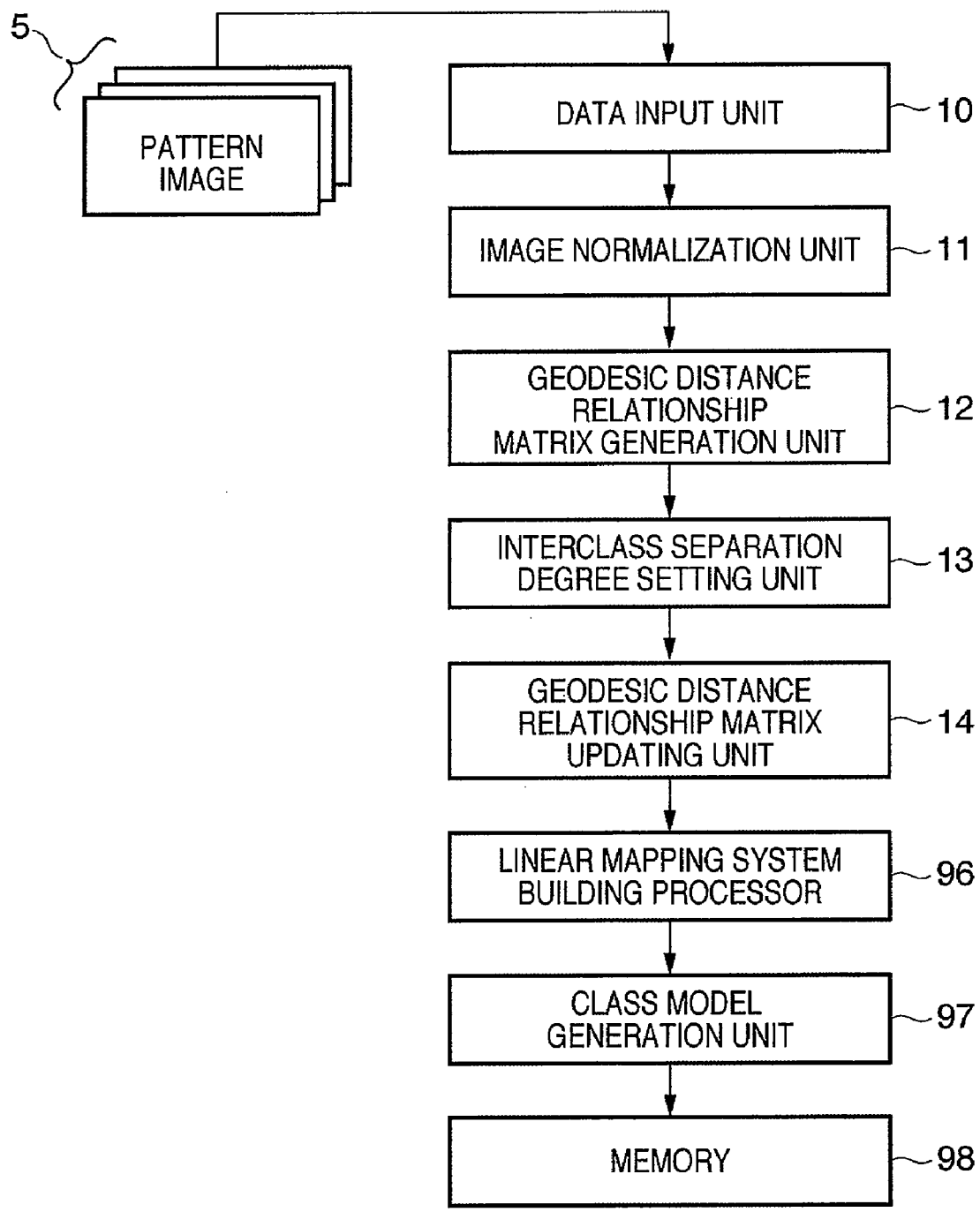
FIG. 9 is a block diagram showing the functional arrangement of respective units which operate in a learning mode of those which configure an information processing apparatus according to the third embodiment of the present invention.

FIG. 9 is a block diagram showing the functional arrangement of respective units which operate in a learning mode of those which configure an information processing apparatus according to this embodiment. Note that the same reference numerals in FIG. 9 denote components common to those shown in FIG. 1, and a repetitive description thereof will be avoided.

Figure 10:
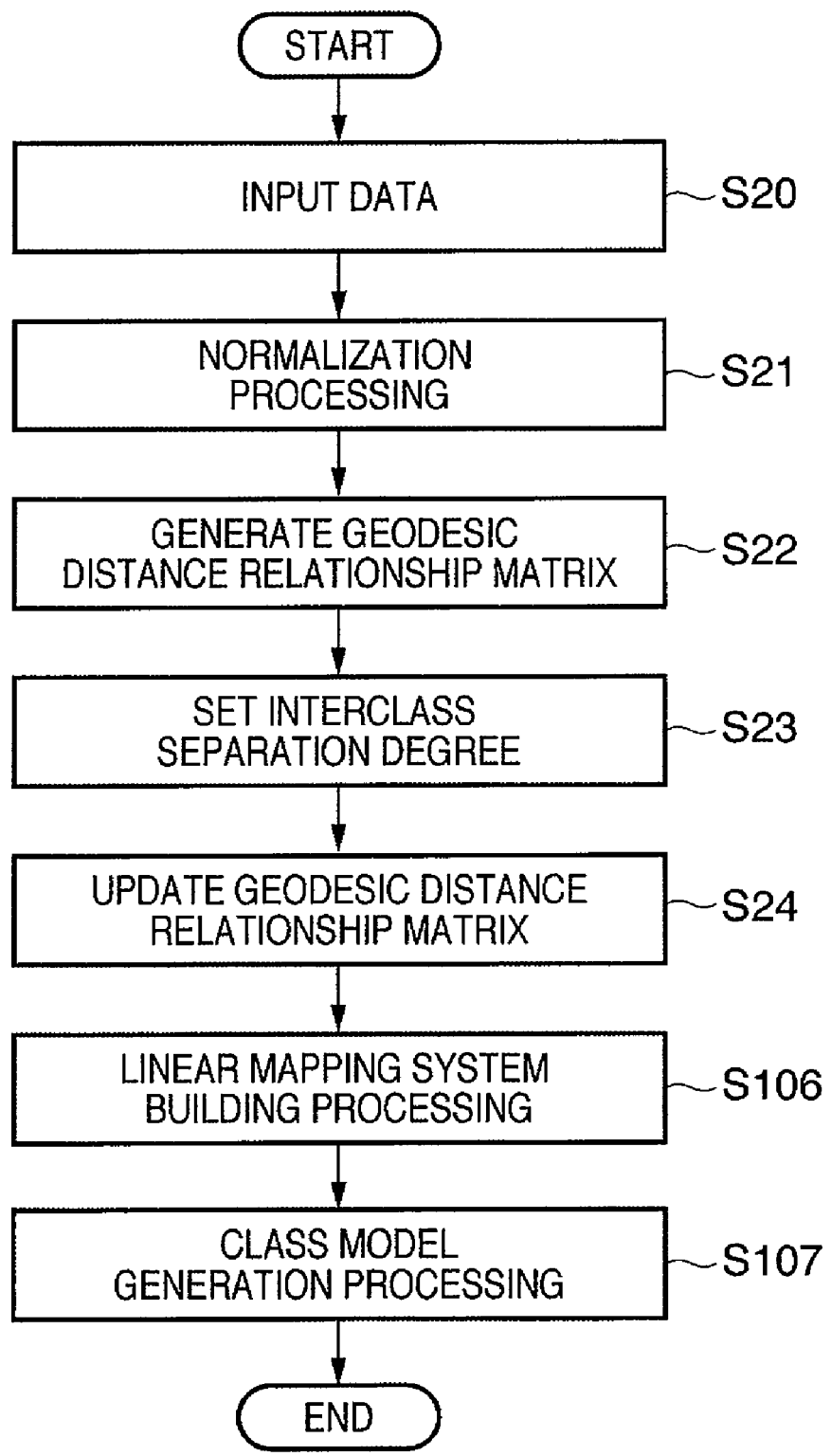
FIG. 10 is a flowchart of processing executed in the learning mode by the information processing apparatus according to the third embodiment of the present invention.

FIG. 10 is a flowchart of processing to be executed by the information processing apparatus according to this embodiment in the learning mode.

Note that the same step numbers in FIG. 10 denote steps common to those in FIG. 2, and a repetitive description thereof will be avoided.

The processing in the learning mode will be described below with reference to FIGS. 9 and 10.

In this embodiment as well, N pattern images (which are the same as those handled in the first embodiment, i.e., labeled pattern images) are input, and the same processing as in the first embodiment is applied to each of the input pattern images. In this way, output vectors corresponding to the pattern images (in this embodiment, assume that the number of dimensions of this output vector is h) are calculated. Since the processes described so far are the same as those in the first embodiment, a repetitive description thereof will be avoided.

In the second embodiment, a mapping system onto a new space that approximately preserves the calculated distorted geodesic distance relationship is built in two steps, i.e., MDS and building of a three-layer NN.

In this embodiment, a linear mapping system is used as this mapping system, and a linear mapping system building processor 96 builds this linear mapping system from sets of distorted geodesic distance relationship matrices and vectors normalized by an image normalization unit 11. This process corresponds to step S106 in FIG. 10.

The processing executed by the linear mapping system building processor 96 in step S106 will be described first. Let A as a matrix description be a linear system to be built. Since the input has the number of dimensions of the normalized vector, i.e., 400 dimensions, if h represents the number of dimensions of a space after mapping, A is a 400×h matrix. A vector z obtained as an output when a 400-dimensional vector x is input to this system is given by z=ATx, and this vector is an h-dimensional vector.

Note that AT is a transposed matrix of A. At this time, a linear mapping system in which an Euclidean distance between output vectors $z_i$ and $z_j$ (=$A^Tx_i$ and $A^Tx_j$) obtained by mapping normalized vectors $x_i$ and $x_j$ approximates a distorted geodesic distance $d_d(i, j)$ is built. Hence, this embodiment calculates this linear mapping matrix A as a minimization problem of an error function J(A) given by:

$$J(A) = \frac{1}{2} \cdot \frac{1}{\sum_{i<j} d_d(i, j)} \sum_{i<j} \frac{(|A^Tx_i - A^Tx_j| - d_d(i, j))^2}{d_d(i, j)} \quad (1)$$

This embodiment calculates A that minimizes this function using a steepest descent method. Let ak (ak is a 400-dimensional vector, k=1, 2, . . . , h) be a column vector of the k-th column of A. In the steepest descent method, all components of A are randomly initialized. Then, the components of A are sequentially updated based on:

$$a'_k = a_k - \eta \cdot \nabla_{a_k} J(A) \quad (2)$$

where $a'_k$ is a column vector of the k-th column of A after being updated once, and η is a positive proportional constant which decides an update amount per updating. Also, $\nabla_{a_k}$ is a partial differentiation by vector $a_k$, and $\nabla_{a_k} J(A)$ is calculated by:

$$\nabla_{a_k} J(A) = \frac{1}{\sum_{i<j} d_d(i, j)} \sum_{i<j} \left[ \frac{r_{i,j} - d_d(i, j)}{d_d(i, j)} \cdot \frac{v_{i,j}}{r_{i,j}} (a_k^T v_{i,j}) \right] \quad (3)$$

for $r_{i,j} = |A^T v_{i,j}|$, $v_{i,j} = x_i - x_j$

In this embodiment, the updating processing given by equation (2) is sequentially executed until the value of the error function J(A) given by equation (1) converges, thereby obtaining matrix A after convergence. As for convergence in this case, as in error convergence determination of the three-layer NN in the second embodiment, when an error nearly ceases to decrease in the updating processes as many as the pre-set number of steps, it can be determined that the error converges. The value η is related to this convergence. If this value is too large, an error is unlikely to converge satisfactorily, but if it is too small, many update processes are required until convergence. Hence, this η value is preferably set to be a value small enough to attain convergence by the number of update times, which is practically allowed.

With the above method, linear mapping matrix A can be calculated as the minimization problem of the error function J(A). In the above description, the number of columns of A is generalized as h, but the value of h needs to be set. In general, as h is larger, the approximation performance is higher, i.e., the value of the error function J(A) can be reduced. However, as h is smaller, mapping can be made on a space in which the redundancy is reduced. Hence, in this embodiment, A is calculated by the above method for h of various values, and A with the smallest value of h from those which satisfy a pre-set condition is selected. More specifically, an initial value of the value of h is set to be 1, and the value of h is incremented by one every time A is calculated. It is verified if A calculated by each value of h satisfies a condition given by:

$$\forall_{i,j,k} d_d(i,j) \leq d_d(i,k) \rightarrow r_{i,j} \leq r_{i,k} \quad (4)$$

Inequality (4) means the condition as to whether or not the distance relationship among arbitrary three points on a space after mapping satisfies at least the order of the distorted geodesic distance relationship. A is calculated by incrementing h by one, and when A which satisfies the relation given by inequality (4) is calculated, the arithmetic operation ends. A obtained at that time is recorded and held in an internal memory of the linear mapping system building processor 96 as a linear mapping system to be calculated by itself. In this embodiment, the error function given by equation (1) is defined, and linear mapping matrix A that minimizes that error function is calculated by the steepest descent method. However, the present invention is not limited to this. In a method of calculating a linear mapping matrix which preserves the distorted geodesic distance relationship as much as possible, and in particular, its order, other error functions may be used, or A may be calculated analytically.

In step S107, a class model generation unit 97 generates class models corresponding to respective labels using the linear mapping system built by the processing of the linear mapping system building processor 96, and all vectors normalized by the image normalization unit 11.

As in the second embodiment, the class model generation unit 97 inputs a normalized vector to the built linear mapping system A, and calculates an output vector of the linear mapping system at that time. Then, the unit 97 executes processing for recording the h-dimensional output vector as a mapped vector and corresponding label as prototype data used in the identification mode to be described later in a memory 98. The prototype data recording processing may be executed for data randomly selected from training data sets as in the second embodiment, but it is executed for all the data in this embodiment as well.

With the aforementioned processing, linear mapping system A built by the processing of the linear mapping system building processor 96, and a plurality of prototype data recorded by the class model generation unit 97 are obtained, thus ending the processing in the learning mode. That is, in the learning mode, linear mapping system A which maps input data on a space in which the redundancy is reduced, the data approach each other if they belong to an identical class in which the redundancy is reduced, and the interclass separation degree becomes a desired separation degree is built. At the mapping destination, models of respective classes are generated.

<Identification Mode>

In the identification mode according to this embodiment, the basic configuration of processors is the same as that in the identification mode of the second embodiment, except for the processing contents in a processor corresponding to the data mapping processor 77 in FIG. 7. For this reason, the configuration of processors are not particularly illustrated in this embodiment, only the processing contents in the processor corresponding to the data mapping processor 77 will be explained, and a description of other processes will not be given.

In this embodiment as well, data is input and an image is normalized, as in the second embodiment. A data mapping processor of this embodiment calculates a mapped vector z using linear mapping system A obtained in the learning mode. The mapped vector z is an h-dimensional vector obtained when a normalized vector x is input to linear mapping system A obtained in the learning mode. That is, only a difference is that the mapped vector is calculated using the three-layer NN in the second embodiment, but it is calculated using the linear mapping system in this embodiment. The subsequent processes corresponding to the identification processor 78 and identification result output unit 79 in the second embodiment search for nearest neighbor prototype data, and output that result.

The difference of the processing in the third embodiment from that in the second embodiment has been explained. As for the method used in the identification processing, various methods can be applied as in the second embodiment, and the same response to an expected input pattern can be made as in the method described in the second embodiment.

Fourth Embodiment

This embodiment will explain an example of a pattern identification method when linear mapping in the third embodiment is extended to non-linear mapping using a Kernel function, as a modification of the pattern identification method described in the third embodiment.

The third embodiment builds the mapping system which can preserve, using linear mapping, the distorted geodesic distance relationship among data (in particular, in the order of distance) as much as possible, and can reduce the redundancy. Using linear mapping, if the distribution of data has a relatively simple shape (even a non-linear distribution), the above object can be achieved. However, when the distribution of data has a very complicated shape, a target mapping system is unlikely to be built.

Hence, in this embodiment, a linear mapping part, i.e., a part of mapping input data using linear mapping matrix A is replaced by non-linear mapping using a Kernel function. Note that the Kernel function is a real symmetric function having a domain of definition $\chi \times \chi$ for a certain set $\chi$, and is a function which satisfies a positive semidefinite property. As an example of such Kernel function, polynomial Kernel $K(x, x')=(x \cdot x'+1)^p$ and Gaussian Kernel $K((x,x')=\exp(-|x-x'|^2/\sigma^2)$ are popularly used.

This embodiment builds a non-linear mapping system from input data x to output data z using such Kernel function. As described above, this embodiment is different from the third embodiment only in the mapping system which is linear mapping or non-linear mapping using the Kernel function. Hence, in this embodiment, only building of a non-linear mapping system using the Kernel function and non-linear mapping using that system will be described, and a description of other processes will not be given.

The third embodiment uses linear mapping given by z=ATx as a mapping system from input data x to output data z. By contrast, non-linear mapping of this embodiment is expressed by $z=\Sigma \alpha n \cdot K(x, xn)$ using N input h-dimensional vectors αn (n=1, 2, . . . , N), corresponding input vectors xn, and a Kernel function K(x,x'). Note that Σ means the sum total from n=1 until n=N.

This mapping depends on a Kernel function to be used (including selection of the function itself and parameters such as p, σ, and the like in the above Kernel function examples). If they are fixed, the mapping of this embodiment is determined by only N h-dimensional vectors αn. Hence, this embodiment builds a mapping system, which uses the aforementioned Gaussian Kernel as the Kernel function, can preserve the distorted geodesic distance relationship among data as much as possible, and can reduce the redundancy, by optimizing the N h-dimensional vectors αn. A parameter σ of the Gaussian Kernel can be an arbitrary constant, and is preferably a constant on the order of Euclidean distance roughly between input data.

Optimization of the N h-dimensional vectors αn is obtained as a solution of a minimization problem of an error function J(Γ) given by:

$$J(\Gamma) = \frac{1}{2} \cdot \frac{1}{\sum_{i<j} d_d(i,j)} \sum_{i<j} \frac{(|\Gamma^T \kappa_i - \Gamma^T \kappa_j| - d_d(i,j))^2}{d_d(i,j)} \quad (5)$$

where Γ is a matrix of N rows×h columns in which a column vector of the k-th column is an N-dimensional vector γk (k=1, 2, . . . , h). Also, $\kappa_i$ is an N-dimensional vector which includes $K(x_i, x_k)$ as the k-th element, and is given by $\kappa_i = \{K(x_i, x_1), K(x_i, x_2), \ldots, K(x_i, x_N)\}^T$. In this embodiment as well, Γ which minimizes this error function is calculated by the steepest descent method. Hence, all components of Γ are randomly initialized. The components of Γ are sequentially updated based on:

$$\gamma'_k = \gamma_k - \eta \cdot \nabla_{\gamma_k} J(\Gamma) \quad (6)$$

where $\gamma'_k$ is a column vector of the k-th column of Γ after being updated once, and η is a positive proportional constant which decides an update amount per updating as in the third embodiment. Also, $\nabla_{\gamma_k}$ is a partial differentiation by vector $\gamma_k$, and $\nabla_{\gamma_k} J(\Gamma)$ is calculated, as in the third embodiment, by:

$$\nabla_{\gamma_k} J(\Gamma) = \frac{1}{\sum_{i<j} d_d(i,j)} \sum_{i<j} \left[ \frac{q_{i,j} - d_d(i,j)}{d_d(i,j)} \cdot \frac{u_{i,j}}{q_{i,j}} (\gamma_k^T u_{i,j}) \right] \quad (7)$$

-continued for $q_{i,j} = |\Gamma^T u_{i,j}|, u_{i,j} = \kappa_i - \kappa_j$

In this embodiment as well, the updating processing given by equation (6) is sequentially executed until the value of the error function J(Γ) in equation (5) converges, as in the third embodiment, thus obtaining matrix Γ after convergence. A row vector of the n-th row of this matrix Γ after convergence is the h-dimensional vector $\alpha n$ to be calculated. Since determination of convergence and setting of η can be the same as those in the third embodiment, a repetitive description thereof will be avoided.

The number h of columns of Γ may be calculated by the same method as in the third embodiment, but a cross validation method which is the same as the method of determining the number of neurons of the middle layer of the three-layer NN used in the second embodiment is preferably used. In this case, data are divided into an adjustment set and validation set, and matrices Γ are calculated for various h values using the adjustment set by the above method as in the third embodiment. Then, mapping systems $z=\Sigma\alpha_k \cdot K(x, x_k)$ defined by the matrices Γ calculated for the respective h values are applied to the validation set, and Γ corresponding to the smallest h value is selected from those which satisfy a pre-set condition. As the condition used in this case, the condition given by inequality (4) in the third embodiment, the condition in which a maximum one of distance error ratios of pairs of all input data is equal to or smaller than a pre-set value and which is used in the first embodiment, and the like may be used.

In this embodiment as well, the error function given by equation (5) is defined, and the matrix Γ which minimizes the error function is calculated by the steepest descent method. However, the present invention is not limited to this. For example, other error functions may be used or the matrix Γ may be calculated analytically as long as such methods calculate the matrix Γ for determining non-linear conversion that maps to preserve the distorted geodesic distance relationship and, in particular, its order. Especially, as for the error function given by equation (5), an L1 norm associated with Γ is added as a regularization term to obtain a more sparse solution, thus modifying equation (5) like:

$$J(\Gamma) = \frac{1}{2} \cdot \frac{1}{\sum_{i<j} d_d(i, j)} \sum_{i<j} \frac{(|\Gamma^T \kappa_i - \Gamma^T \kappa_j| - d_d(i, j))^2}{d_d(i, j)} + \lambda \cdot \sum_k |\gamma_k|_{L1} \quad (8)$$

where $|\gamma_k|L1$ is the L1 norm of $\gamma_k$, and Σk of the second term means the sum total from k=1 to k=h. λ is a positive parameter required to decide the regularization effect, i.e., a constant used to decide the regularization effect. The regularization effect is enhanced by increasing the value of λ. However, a value to be used practically can be experimentally decided according to the sparseness to be calculated and final mapping performance. Using the error function given by equation (8), $\nabla_{\gamma_k} J(\Gamma)$ given by equation (7) is modified as:

$$\nabla_{\gamma_k} J(\Gamma) = \frac{1}{\sum_{i<j} d_d(i, j)} \sum_{i<j} \left[ q_{i,j} - \frac{d_d(i, j)}{d_d(i, j)} \cdot \frac{u_{i,j}}{q_{i,j}} (\gamma_k^T u_{i,j}) \right] + \Lambda_k^T \gamma_k \quad (9)$$

where $\Lambda_k$ is a diagonal matrix of N-th degree, in which a diagonal component of the n-th row and n-th column is $\lambda/|\gamma_{kn}|$ and all other components are "0", when the n-th element of $\gamma_k$ is represented by $\gamma_{kn}$. Hence, in order to obtain a more sparse solution, the updating processing given by equation (6) is sequentially executed using this equation (9) until the value of the error function J(Γ) given by equation (8) converges, thus obtaining the matrix Γ after convergence.

In the processes of this embodiment corresponding to the class model generation unit 97 and data mapping processor 77 in the third embodiment, the linear mapping z=ATx in the third embodiment need only be replaced by $z=\Sigma\alpha_k \cdot (x, x_k)$ using the Kernel function K in the learning mode.

With the above method, the linear mapping in the third embodiment can be replaced by the non-linear mapping using the Kernel function to cope with a more complicated pattern distribution. In the description of this embodiment, the Kernel function is fixed. However, mapping systems may be built using various Kernel functions (as well as selection of the functions themselves and parameters such as p, a, and the like in the Kernel function examples), and mapping corresponding to the minimum value of the error function in cross validation may be selected.

In the examples of the pattern identification method of the second to fourth embodiments described above, a grayscale image obtained by extracting a human face is used as input data. However, the present invention is not limited to this, and is applicable to image data of other categories and audio data. Also, for example, even general data such as Web contents and the like can be used as input data in the second to fourth embodiments as long as mapping of data onto a multidimensional space determined by distances of data and some parameters can be defined. In this case, the error function given by equation (1), (5), or (8) may be used, and parameters that specify mapping may be set to minimize this error function.

Fifth Embodiment

In the above description, all the units (except for memories) shown in FIGS. 1, 4, 7, and 9 are configured by hardware components. However, these units may be implemented by software. That is, these units may be implemented as computer programs for making a computer execute the processes corresponding to the respective unit.

Figure 11:
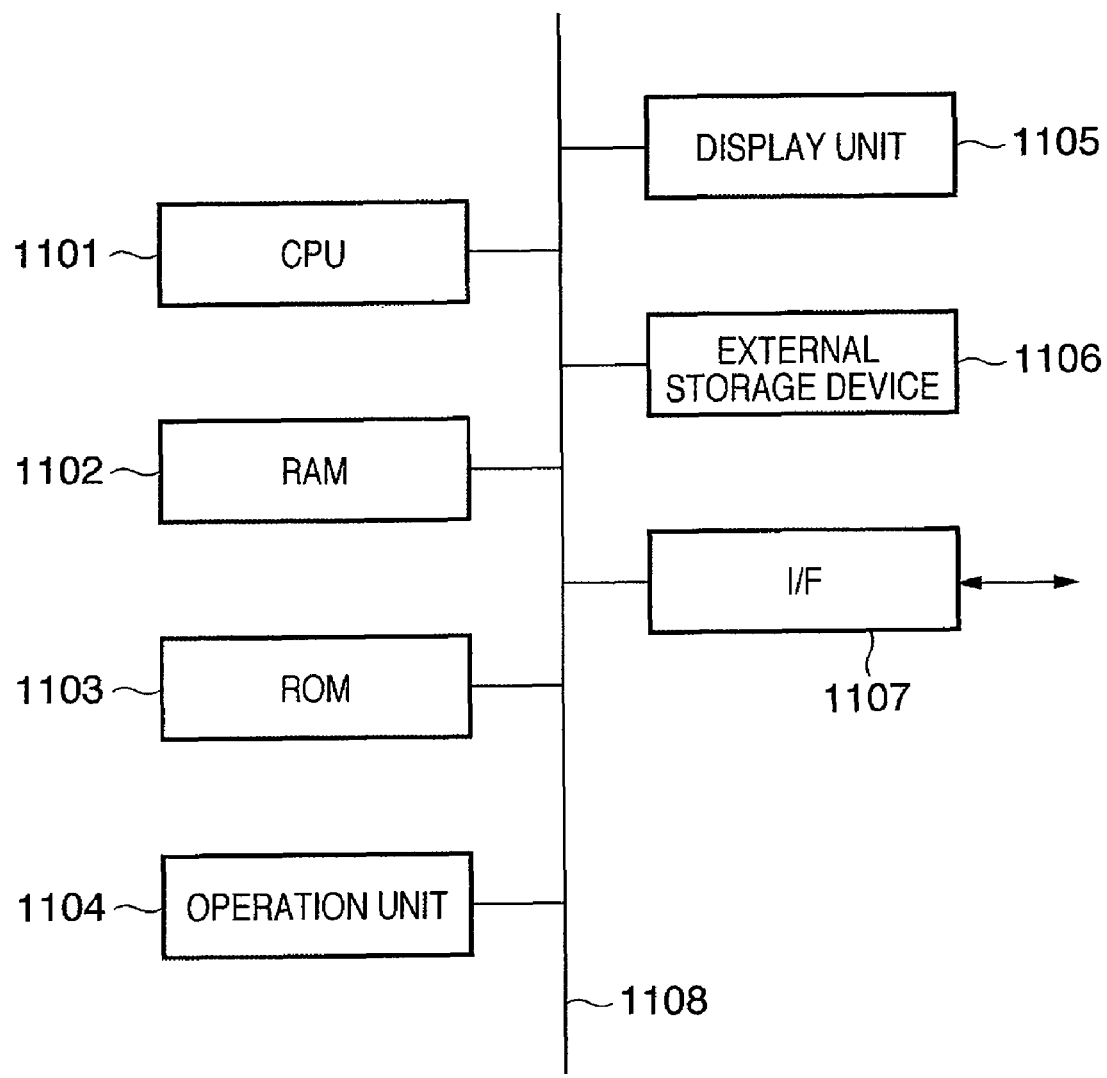
FIG. 11 is an exemplary block diagram showing the hardware arrangement of a computer which executes a computer program when the respective units shown in FIGS. 1, 4, 7, and 9 are implemented by the computer program.

FIG. 11 is an exemplary block diagram showing the hardware arrangement of a computer for executing computer programs when the respective units shown in FIGS. 1, 4, 7, and 9 are implemented by the computer programs.

A CPU 1101 controls the overall computer using programs and data stored in a RAM 1102 and ROM 1103, and executes processes to be implemented by the units shown in FIGS. 1, 4, 7, and 9.

The RAM 1102 has an area for temporarily storing programs and data loaded from an external storage device 1106 and those received from an external device via an I/F 1107. The RAM 1102 also has a work area used when the CPU 1101 executes various processes. That is, the RAM 1102 can provide various areas as needed. The RAM 1102 also serves as the memories 16, 48, and 98.

The RAM 1103 stores setting data, a boot program, and the like of this computer.

An operation unit 1104 comprises a keyboard, mouse, and the like, and the user of this computer can input various instructions and data by operating the operation unit 1104. For example, in the "setting processes" in the above description, data, instructions, and the like input by the user using the operation unit 1104 may be accepted.

A display unit 1105 comprises a CRT, liquid crystal display, or the like, and can display the processing result of the CPU 1101 by means of images, characters, and the like. For example, the display unit 1105 can display the identification result as the processing result in the identification mode by means of images, characters, and the like. A list of pattern images may be displayed on the display screen of this display unit 1105, and the user may select a pattern image to be processed by this computer from those displayed in the list using the operation unit 1104.

The external storage device 1106 is a large-capacity information storage device represented by a hard disk drive. The external storage device 1106 saves an OS (operating system), programs and data for making the CPU 1101 execute the functions of the respective units shown in FIGS. 1, 4, 7, and 9, function programs and data, which have been explained as those set in advance, and so forth. The external storage device 1106 also saves data to be processed such as pattern images and the like. Note that the external storage device 1106 may also have the functions of the memories 16, 48, and 98.

The programs and data saved in the external storage device 1106 are loaded onto the RAM 1102 as needed under the control of the CPU 1101. The CPU 1101 executes the processes using these loaded programs and data. As a result, this computer can execute processes to be implemented by the respective units shown in FIGS. 1, 4, 7, and 9.

The I/F 1107 is used to connect this computer to an external device. For example, by connecting this I/F 1107 to a network such as a LAN, Internet, or the like, pattern images and the like can be downloaded from a device on the network via the I/F 1107. Also, the processing result of this computer can be sent to a device on the network via the I/F 1107.

Reference numeral 1108 denotes a bus which interconnects the aforementioned units. Note that the arrangement shown in FIG. 11 is an example, and the computer may have any other arrangements as long as they can execute the aforementioned computer programs.

Other Embodiments

The objects of the present invention can be achieved as follows. That is, a recording medium (or storage medium), which records a program code of software that can implement the functions of the above-mentioned embodiments is supplied to a system or apparatus. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function expansion card or a function expansion unit, which is inserted in or connected to the computer. After that, the functions of the above-mentioned embodiments are implemented by some or all of actual processing operations executed by a CPU or the like arranged in the function expansion card or function expansion unit based on an instruction of the program code. Such case is also included in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-130898 filed May 16, 2007, which is hereby incorporated by reference herein in its entirety.

What is claimed is:

1. An information processing-method comprising:
   an input step of inputting processing data which belong to different classes and label data indicating the classes to which the processing data belong;
   a first calculation step of calculating a distance relationship between the processing data input in the input step;
   a setting step of setting an interclass separation degree between the classes;
   an updating step of updating the distance relationship based on the label data and the interclass separation degree; and
   a second calculation step of calculating a data mapping relationship which approximates a distance relationship updated in the updating step.

2. The method according to claim 1, wherein the distance relationship is a geodesic distance relationship, and the distance relationship approximated using the data mapping relationship is a Euclidean distance relationship.

3. The method according to claim 2, wherein assuming that a graph distance $dG(x1, x2)$ between two processing data $x1$ and $x2$ is $\infty$ when the processing data $x1$ and $x2$ are not neighboring data,
a geodesic distance $dM(\xi, \zeta)$ between two processing data $\xi$ and $\zeta$ assumes smaller one of $dG(\xi, \zeta)$ and $dG(\xi, a) + dG(a, \zeta)$ via processing data a different from the processing data $\xi$ and $\zeta$.

4. The method according to claim 3, wherein the graph distance $dG(x1, x2)$ between two processing data $x1$ and $x2$ is a Euclidean distance when the processing data $x1$ and $x2$ are neighboring data.

5. The method according to claim 3, wherein the graph distance $dG(x1, x2)$ between two processing data $x1$ and $x2$ is one of a Minkowski distance and a Mahalanobis distance when the processing data $x1$ and $x2$ are neighboring data.

6. The method according to claim 1, wherein in the setting step, the interclass separation degree is set in accordance with a separation degree between the classes, which is set in advance.

7. The method according to claim 6, wherein in the setting step, when the separation degree is large, a large interclass separation degree is set, and when the separation degree is small, the small interclass separation degree is set.

8. The method according to claim 1, wherein the setting step comprises a third calculation step of calculating a distance between the classes, and the interclass separation degree is set based on the distance between the classes.

9. The method according to claim 8, wherein in the setting step, when the distance between the classes is small, a large interclass separation degree is set.

10. The method according to claim 8, wherein in the third calculation step, the distance between the classes is calculated using one of a nearest neighbor method, farthest neighbor method, group average method, centroid method, median method, Ward method, and flexible method.

11. The method according to claim 3, wherein in a determination method of whether or not the two processing data $x1$ and $x2$ are neighboring data, when processing data as many as the pre-set number of data in ascending order of distance from the processing data x1 include the processing data x2, it is determined that the two processing data x1 and x2 are neighboring data.

12. The method according to claim 3, wherein in a determination method of whether or not the two processing data x1 and x2 are neighboring data, when a distance between the two processing data x1 and x2 is not more than a pre-set distance, it is determined that the two processing data x1 and x2 are neighboring data.

13. The method according to claim 1, wherein in the updating step, a distance between two processing data is updated in proportion to the interclass separation degree between classes to which the two processing data respectively belong, and a distance to processing data which belongs to an identical class is updated to be smaller than a distance to processing data which belongs to a different class.

14. The method according to claim 1, wherein in the updating step, a distance between two processing data is updated in proportion to the interclass separation degree between classes to which the two processing data respectively belong, and a distance to processing data which belongs to an identical class is multiplied by a positive number smaller than 1.

15. The method according to claim 1, wherein in the updating step, a distance between two processing data is updated in proportion to the interclass separation degree between classes to which the two processing data respectively belong, and a distance to processing data which belongs to an identical class is set to be a positive number smaller than a distance to processing data which belongs to a different class.

16. The method according to claim 1, wherein in the second calculation step, mapping which minimizes an error between a distance relationship on a space after mapping and a distance relationship after updating is calculated.

17. The method according to claim 1, wherein in the second calculation step, a correspondence relationship of processing data after mapping is calculated using multidimensional scaling.

18. The method according to claim 17, wherein in the second calculation step, a neural network trained using the calculated correspondence relationship as supervisory data is built.

19. The method according to claim 18, wherein the neural network is a multilayer feedforward neural network.

20. The method according to claim 16, wherein in the second calculation step, an order of the distance relationship after mapping at least satisfies an order of the distance relationship after updating.

21. A computer-readable storage medium for storing a computer program for making a computer execute an information processing method according to claim 1.

22. An information processing apparatus, comprising:
an input unit adapted to input processing data which belong to different classes and label data indicating the classes to which the processing data belong;
a first calculation unit adapted to calculate a distance relationship between the processing data input by the input unit;
a setting unit adapted to set an interclass separation degree between the classes;
an updating unit adapted to update the distance relationship based on the label data and the interclass separation degree; and
a second calculation unit adapted to calculate a data mapping relationship which approximates a distance relationship updated by the updating unit.

* * * * *